US 12,257,127 B2

(12) United States Patent
Montero et al.

(10) Patent No.: US 12,257,127 B2
(45) Date of Patent: Mar. 25, 2025

(54) DENTAL IMPLANT SYSTEM

(71) Applicant: BIOMET 3I, LLC, Palm Beach Gardens, FL (US)

(72) Inventors: Miguel G Montero, Boynton Beach, FL (US); Isabel-Marie Scalise, West Palm Beach, FL (US); Michael D Bobby, Port St. Lucie, FL (US); Werner Weithaler, Postal (IT); Andreas Geier, Gargazon (IT); Ryan Weller, Palm City, FL (US)

(73) Assignee: BIOMET 3I, LLC, Palm Beach Gardens, FL (US)

( * ) Notice: Subject to any disclaimer, the term of this patent is extended or adjusted under 35 U.S.C. 154(b) by 0 days.

(21) Appl. No.: 17/676,497

(22) Filed: Feb. 21, 2022

(65) Prior Publication Data

US 2022/0265396 A1  Aug. 25, 2022

Related U.S. Application Data

(60) Provisional application No. 63/152,519, filed on Feb. 23, 2021.

(51) Int. Cl.
*A61C 8/00* (2006.01)

(52) U.S. Cl.
CPC .......... *A61C 8/0022* (2013.01); *A61C 8/0066* (2013.01); *A61C 8/0074* (2013.01)

(58) Field of Classification Search
CPC ... A61C 8/0022; A61C 8/0066; A61C 8/0074; A61C 8/0018; A61C 8/005; A61C 8/0048

USPC ...................................... 433/174–176, 201.1
See application file for complete search history.

(56) References Cited

U.S. PATENT DOCUMENTS

| 10,898,301 B2 | 1/2021 | Thome et al. | |
| 2014/0065574 A1* | 3/2014 | Benzon | A61C 13/0006 433/201.1 |
| 2016/0151127 A1* | 6/2016 | Simmonds | A61C 8/0068 433/201.1 |

FOREIGN PATENT DOCUMENTS

WO    WO-2008157138 A2 * 12/2008 ............. A61C 8/005

OTHER PUBLICATIONS

Extended European Search Report for European Patent Application No. 22158346.1, dated Jul. 8, 2022 10 pages.
Official Action for European Patent Application No. 22158346.1, dated Jul. 10, 2023 5 pages.

* cited by examiner

*Primary Examiner* — Ralph A Lewis
*Assistant Examiner* — Mirayda A Aponte
(74) *Attorney, Agent, or Firm* — Sheridan Ross P.C.

(57) ABSTRACT

A dental implant system that can include a prosthetic assembly and a dental implant. The prosthetic assembly can include a dental component and a retention screw. The dental component and the retention screw each have interference elements that are configured to engage when a removal torque is applied to the screw. When the interference element engage each other, a portion of the removal torque is converted into a linear force that is exerted on the dental component in a removal direction thereby separating the dental component from the dental implant.

16 Claims, 26 Drawing Sheets

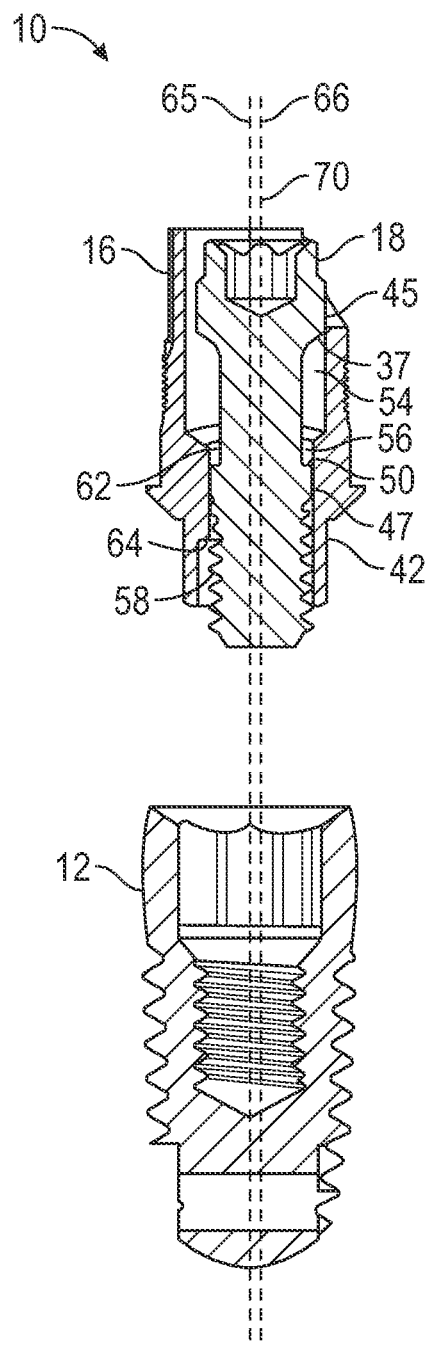
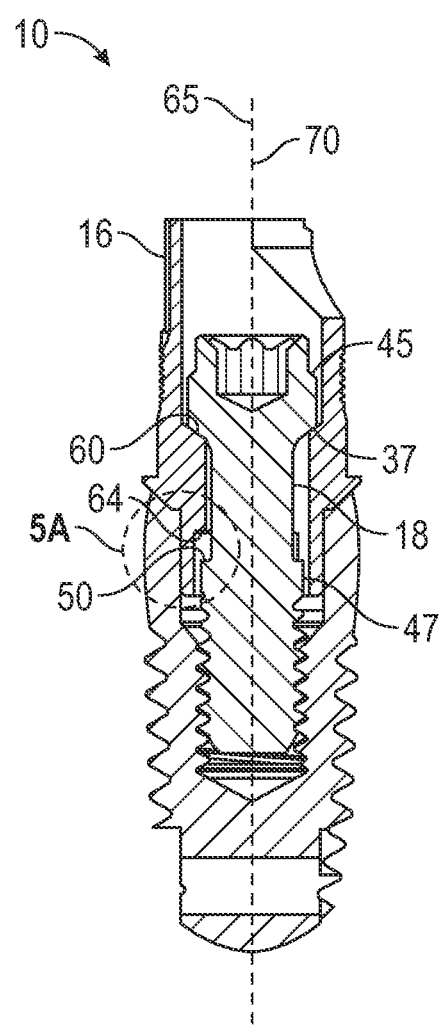
FIG. 4A
FIG. 4B

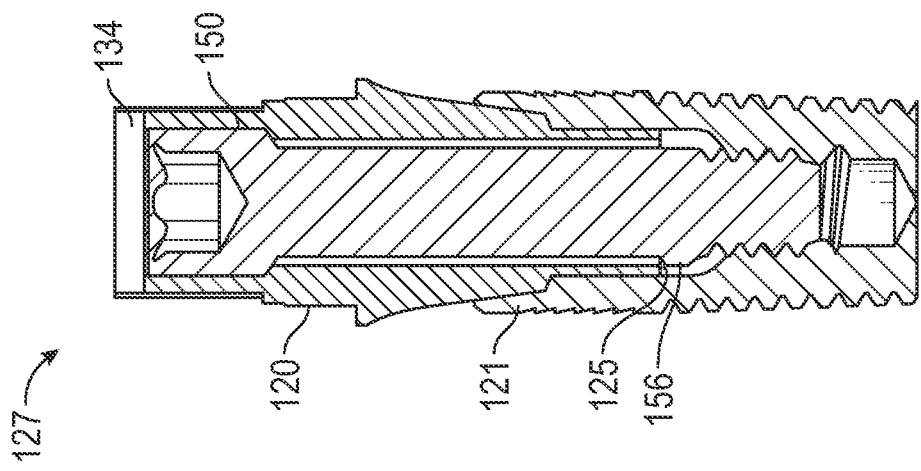
FIG. 14
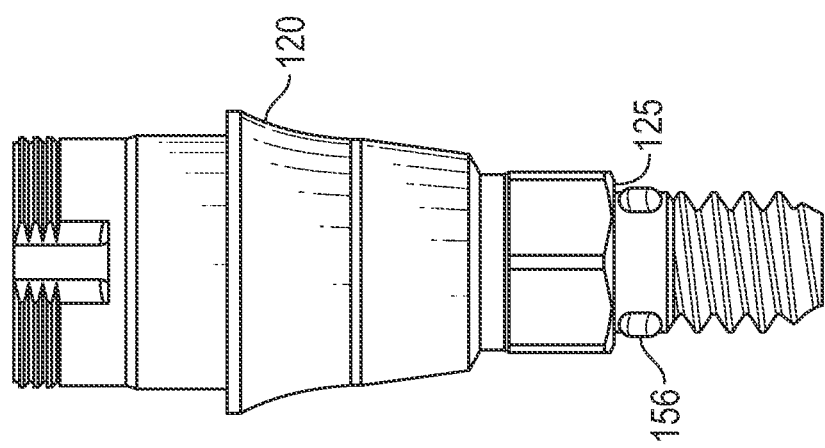
FIG. 13
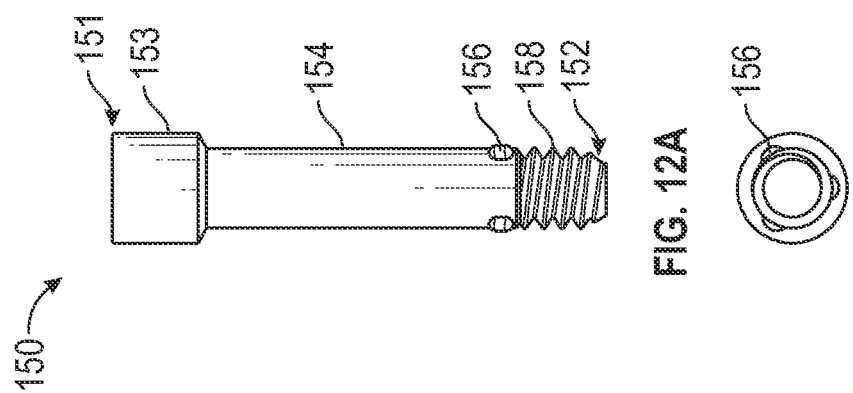
FIG. 12A
FIG. 12B

DENTAL IMPLANT SYSTEM

CLAIM OF PRIORITY

This application claims the benefit of U.S. Provisional Patent Application Ser. No. 63/152,519, filed on Feb. 23, 2021, the benefit of priority of which is claimed hereby, and which is incorporated by reference herein in its entirety.

FIELD

The present subject matter pertains generally to the field of dental implants and dental components. The subject matter disclosed herein can also be applied to other orthopedic applications such as spinal pedicel screws, bone screws used in trauma applications or other bone screws consisting of a three-piece assembly (bone screw, adapting head, fastening screw). More particularly, but not by way of limitation, the subject matter pertains to coupling and decoupling an interface between a dental implant and a dental component.

BACKGROUND

A dental implant can be used in an oral treatment procedure to restore appearance or function of a removed tooth. A dental implant can mimic a root of a natural tooth that is replaced. A surgeon can replace the natural tooth with a prosthetic tooth that is mounted on a coronal portion of an abutment, which in turn, is attached to the dental implant on an apical portion. During surgery, the surgeon can insert the dental implant into a dental bone cavity. A successful dental implant procedure generally requires more than bone affixation or osseointegration. Implant success can also require maintenance of the cortical bone at the coronal crest of the implant and maintenance of soft tissue structures in the implant region. The health of tissues in this region contributes to the aesthetic appearance of a full restoration. Maintenance of healthy tissue in the implant region can also lead to the creation of a tissue seal that hinders the propagation of infection along the implant body.

In both natural teeth and dental implants, ectodermal tissue serves to protect against intrusion of bacteria and other foreign materials. An ectodermal tissue seal that protects the alveolar bone is known as the biologic width. The biologic width is a tissue ring and its position is dependent on the geometry and surgical placement of the dental implant. On a two-piece dental prosthesis, a micro-gap generally exists between the implant and the dental component. There is evidence to suggest that the position of the micro-gap has an effect on the position of the biologic width, and therefore on the height of the crestal alveolar bone.

Additional evidence suggests that both the vertical and horizontal offset of the micro-gap can contribute to crestal bone height. By offsetting the micro-gap away from the outer edges of the implant, crestal bone height can be maintained. However, such offsetting can result in a smaller abutment/implant interface and may compromise the mechanical strength of the restoration. To accomplish such an offset connection, manufacturers have introduced a conical connection between the abutment and the implant.

A conical connection might use interfacing shallow angle tapers on the abutment and the implant to shift the micro-gap. This connection can create a sealed interface that discourages penetration of bacteria or other foreign substances into a screw thread and other internal features of an implant body.

OVERVIEW

The present patent document describes examples that can include any one or combinations of an implant, a dental component, retention screw, and a dental implant system. As discussed herein, the conical connection between the dental implant and the dental component can provide various benefits. However, the conical connection provides an interference fit (e.g., friction fit) between the dental implant and the dental component. That is, a conical taper on the dental implant is configured to mate with a conical taper on the dental component to provide the interference fit. While the interference fit can securely maintain the dental component, as well as provide the benefits discussed herein, removal of the dental component, if needed, can be difficult and can require additional tools.

For example, during treatment or periodic maintenance, it may be necessary to remove or "pop out" the dental component (e.g., abutment) from the implant, which would require that the dental health practitioner exerts force to remove the component. However, because of cyclic compression on the components, caused by chewing; these can adhere to each other, making it harder for them to be removed, thus causing discomfort or even injury to the patient.

The issue increased torque during removal of a dental component (e.g., an abutment) after mechanical cycling is known in the state of the art. Increasing the removal torque of prosthetic components, especially those including Morse cone, can lead to fracture of the tool in use, or fracture of the component, if employed excessively.

The present inventors have recognized, among other things, that being able to release the interference fit between the dental component and the dental implant without having to introduce a new tool or increasing the removal torque would provide various benefits. Thus, the present invention discloses dental component/implant connection systems that include an interference fit between the dental component and the dental implant that can be separated without the use of additional tools. For example, the dental components of the present invention can be coupled to the dental implant via a screw. As discussed herein; the screw can be used to apply a force to the abutment in the pop-out direction to release the friction fit connection between the dental component and the dental implant.

BRIEF DESCRIPTION OF THE DRAWINGS

In the drawings, which are not necessarily drawn to scale, like numerals can describe similar components in different views. Like numerals having different letter suffixes can represent different instances of similar components. The drawings illustrate generally, by way of example, but not by way of limitation, various examples discussed in the present document.

FIG. 4A is a dental implant system partially assembled, in accordance with an example of the present disclosure.

FIG. 4B is the dental implant system in FIG. 4A fully assembled, in accordance with an example of the present disclosure.

FIG. 12A is a side-view of a retention screw, in accordance with an example of the present disclosure.

FIG. 12B is a side-view of a retention screw, in accordance with an example of the present disclosure.

FIG. 13 is an assembled view of the dental component and the retention screw, in accordance with an example of the present disclosure.

FIG. 14 is a cross-sectional view of the assembled dental implant system including the dental implant, the dental component, and the retention screw 150, in accordance with an example of the present disclosure.

DETAILED DESCRIPTION

The present invention defines a dental implant system including a prosthetic assembly and a dental implant. The prosthetic assembly can include a dental component and a retention screw, where the dental component is configured to be coupled to the dental implant via the screw. The dental component and the screw are designed to allow relative rotation and limit relative longitudinal motion between the dental component and the retention screw. For example, the dental component and the retention screw each have interference elements that are configured to engage when a removal torque is applied to the screw. When the interference elements engage each other, a portion of the removal torque is converted into a linear force that is exerted on the dental component, in a removal direction, thereby separating the dental component from the dental implant.

Figure 1:
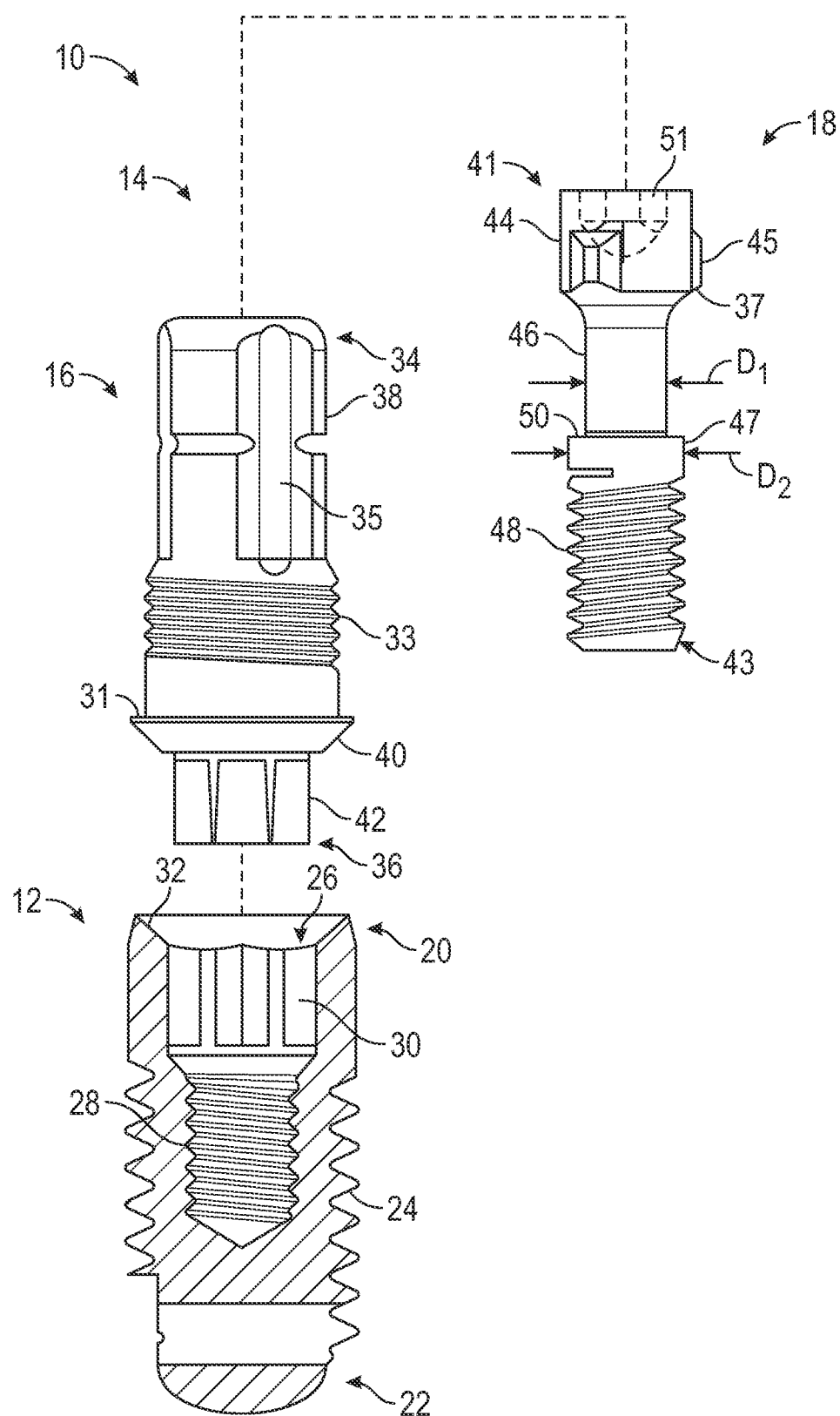
FIG. 1 is an exploded view of a dental implant system, in accordance with an example of the present disclosure.

FIG. 1 is an exploded view of a dental implant system 10 according to an example of the present disclosure. The dental implant system 10 can include a dental implant 12 (also herein "implant 12") and a prosthetic assembly 14. The prosthetic assembly 14 can include a dental component 16 and a retention screw 18 (also herein "screw 18"). The implant 12 is configured to be screwed into the bone of a patient and the dental component 16 is configured to be connected to the implant 12, As discussed herein, the dental component 16 can be inserted into the dental implant 12 and the screw 18 extends through the dental component 16 and couples with the dental implant 12 to couple the dental component 16 to the dental implant 12.

The implant 12 can extend from a proximal end 20 to a distal end 22. The implant 12 can include at least one thread 24 for screwing the implant 12 into the bone of a patient. An interior bore 26 extends distally from the proximal end 20 toward the distal end 22. The interior bore 26 can include a threaded portion 28, an anti-rotation chamber 30, and a dental component engagement portion 32.

The dental component 16 can extend from a proximal end 34 to a distal end 36. The dental component 16 can include a post 38, an implant engagement surface 40, an anti-rotation portion 42, and a bore 52 extending therethrough (see FIGS. 3A-D). When coupled together, the anti-rotation portion 42 of the dental component 16 is received within the anti-rotation chamber 30 of the implant 12 to rotationally lock the dental component 16 to the implant 12. The anti-rotation chamber 30 and the anti-rotation portion 30 have corresponding anti-rotation geometry. The anti-rotation geometry can be of any form, but generally can be in the form of, e.g., but not limited to, a hexagon, a taper, channel, etc.

In one example, the post 38 can extend from a shoulder 31 and include anti-rotation grooves 35 and a plurality of grooves 33. The anti-rotation grooves 35 extend longitudinally from the proximal end 34 toward the distal end 36 and the plurality of grooves 33 extend circumferentially around the post 38. One or more of the grooves 33 can extend partially or entirely around the circumference of the post 38. While shown as positioned distal to the anti-rotation grooves 35, in one example, the plurality of grooves 33 can intersect the anti-rotation grooves 35.

When a mating component (not shown) is coupled to the post 38 a distal portion of the mating component can abut the shoulder 31 and corresponding nubs of a bore of the mating component can be received within the anti-rotation grooves 35 to prevent rotational of the mating component relative to the dental component 12. The plurality of grooves 33 can receive coupling material to help adhere the mating component to the dental component 16.

In previous approaches, a post could have protrusions that would be received within a corresponding groove along the bore of the mating component. However, the protrusions along the post would interfere with the shoulder 31. For example, a width of the shoulder 31 measured from the post to an edge of the shoulder 31 can be maximized. With protrusions extending from a post, that width along the protrusions is reduced. Thus, the anti-rotation grooves 35 of the present invention prevent rotation between the mating component and the dental component 16 while maintaining a constant width along the shoulder 31.

The screw 18 extends from a proximal end 41 to a distal end 43. The screw 18 can include a head 44, a shaft 46, an engagement portion 47, and a threaded portion 48. The engagement portion 47 can be part of the threaded portion 48 and include threads or can be separate from the threaded portion 48 and not include threads. Additionally, the engagement portion 47 can have a diameter D2 that is the same or different from a maximum diameter of the threaded portion 48. In one example, the shaft 46 has a diameter D1 that is less than the diameter D2 of the engagement portion 47 such that an interference shoulder 50 is formed. While shown as a flat surface perpendicular to a longitudinal axis, the interference shoulder 50 can be angled from the longitudinal axis, be curved, or have other geometries.

The head 44 can include a bore 51 that is configured to receive a tool, e.g., a driver. The bore 51 has a non-rotational geometry that can couple with a tool such that rotational force applied to the tool is translated to the screw 18. In one example, the head 44 can include one or more lobes 45. In the example shown, the head 44 has three lobes 45. The screw 18 can include a transition surface 37 that can be curved, flat, or tapered that transitions from the head 44 to the shaft 46.

While the example shown in FIG. 1 illustrates the engagement surfaces 32, 42 as being tapered surfaces various engagement surfaces can be used. For example, the dental component engagement surface 40 contacts the corresponding inner wall (i.e., the dental implant engagement surface 32) to form a seal throughout the periphery of the dental component 16. The seal can prevent migration of bacterial as well as increase resistance to lateral forces. As discussed herein, the use of a Morse cone (also known as a 'Morse Taper') can be used to provide a seal. The interference fit formed from a Morse Taper is difficult to break and forces necessary to break the seal can likely cause damage to, e.g., the implant and the patient.

Figure 2:
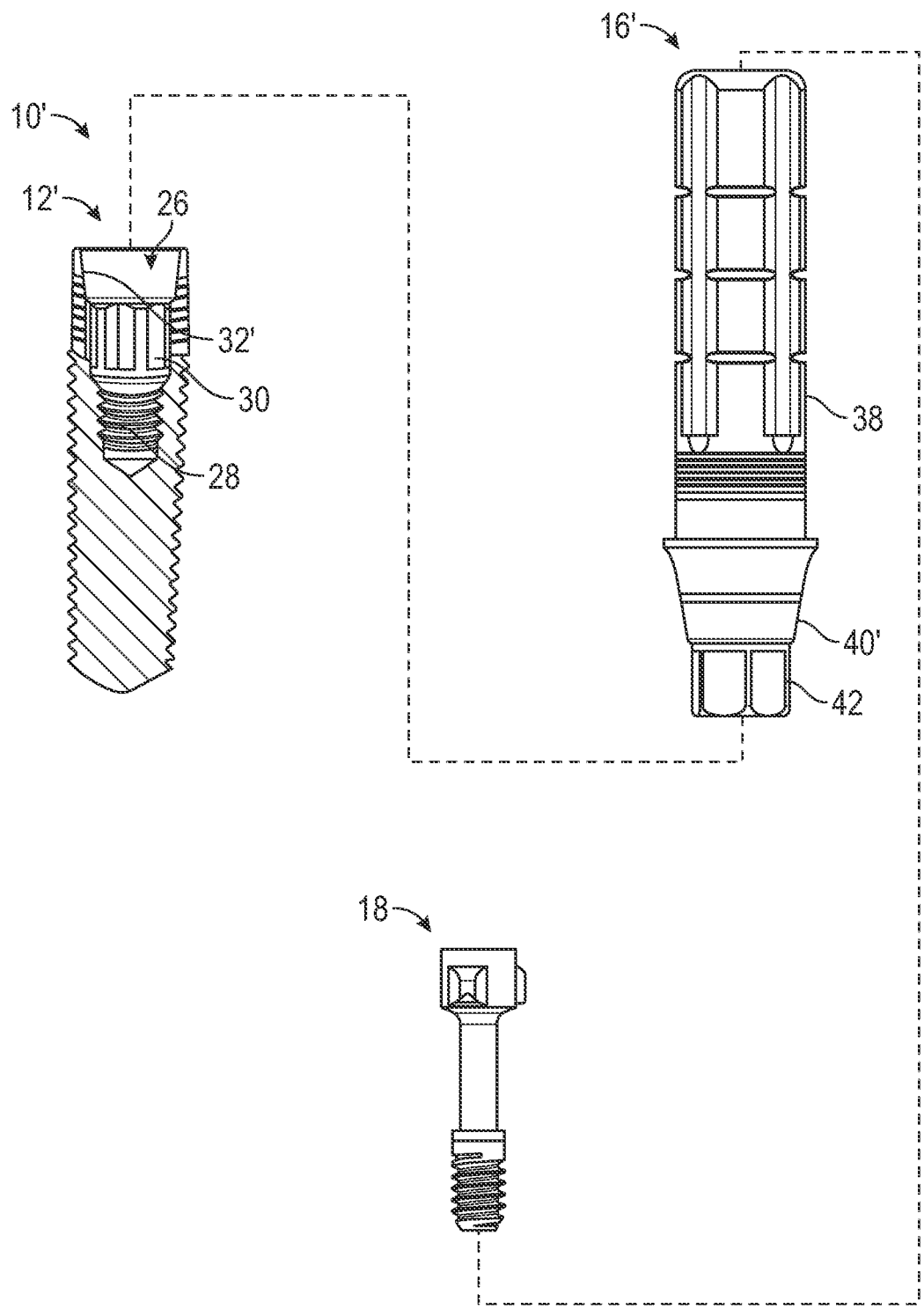
FIG. 2 is an exploded view of a dental implant system, in accordance with an example of the present disclosure.

FIG. 2 illustrates another dental implant system 10' comprising implant 12' and dental component 16', where the dental implant engagement surface 32' and the dental component engagement surface 40' are different from the dental implant system 10 in FIG. 1. In particular, the length and angle of the tapered surfaces are different and illustrate a Morse taper. However, other configurations are contemplated.

After a patient has the dental implant system 10 installed, during chewing dental component 16 can be cyclically compressed against the implant 12 where it is installed. With each compression cycle, micro-deformations in the components or even gradual compression on the seal between the dental implant engagement surface 40 of the dental component 16 and the dental component engagement surface 32 of the implant 12 causes them to adhere to each other, so that a dental health practitioner will have great difficulty in separating them without damaging the components or injuring the patient. To remedy this problem, the dental implant system 10 of the present invention includes elements, which, on the one hand, allows relative rotation between the dental component 16 and the retention screw 18, and, on the other hand, limits the longitudinal motion therebetween so that, when the screw 18 receives a removal torque, the interference shoulder 50 eventually engages into an interference ledge 64 of an interference wall 62 (see FIGS. 3A-D), converting and transmitting part of the removal torque which is applied to the screw 18, into a force in the removal direction of the dental component 16.

Figure 3A:
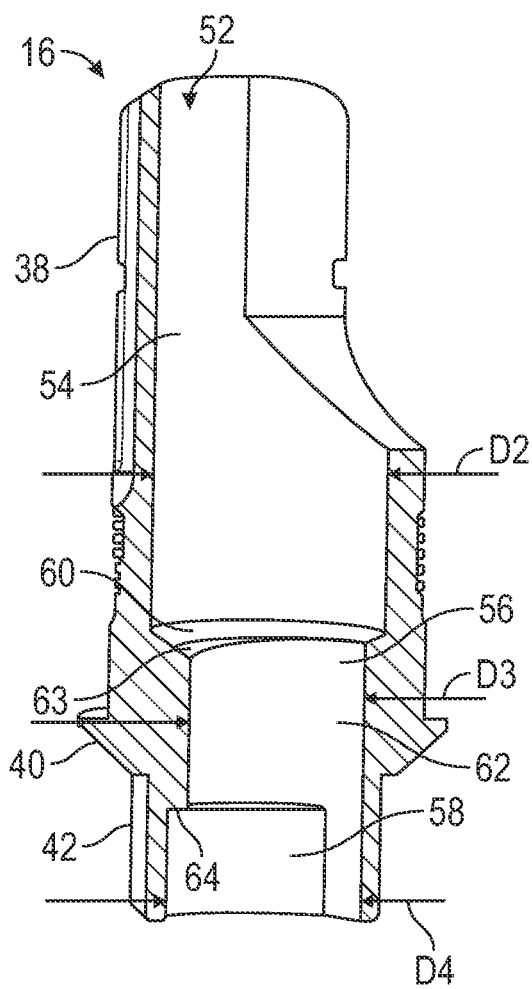
FIG. 3A is a partial cross-sectional view of a dental component, in accordance with an example of the present disclosure.
Figure 3B:
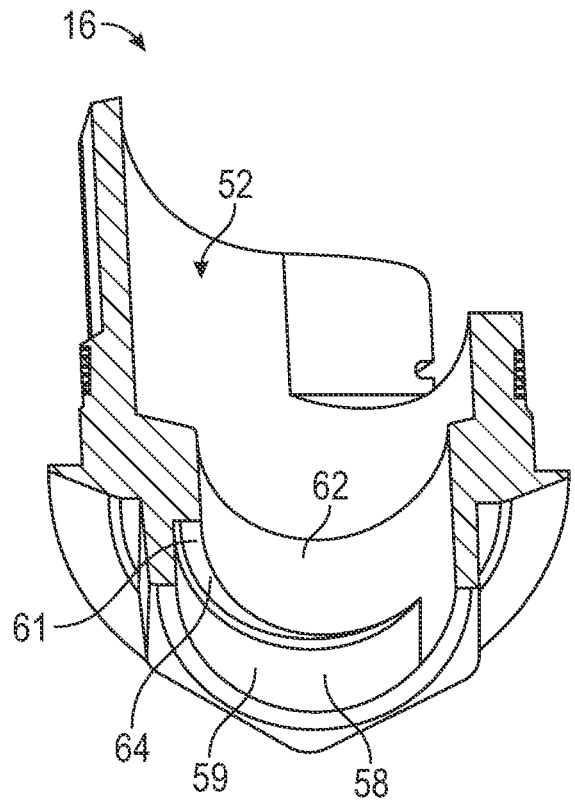
FIG. 3B is a perspective view of a partial cross-sectional of the dental component 16, in accordance with an example of the present disclosure.
Figure 3C:
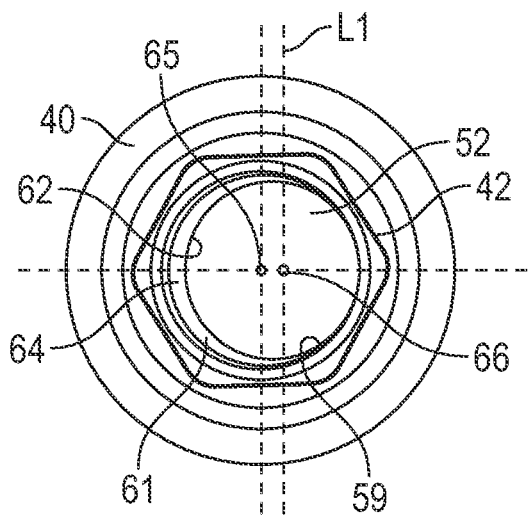
FIG. 3C is a bottom-up view of the dental component, in accordance with an example of the present disclosure.
Figure 3D:
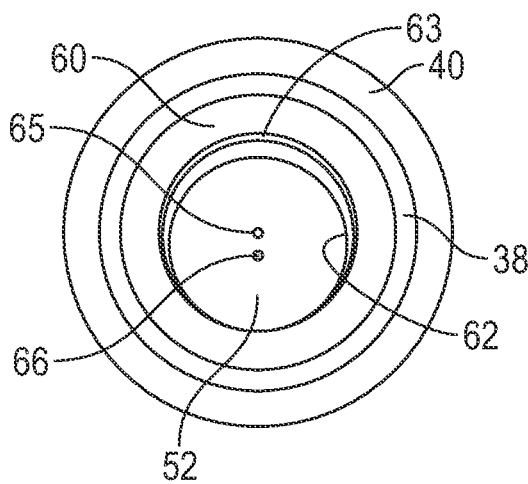
FIG. 3D is a top-down view of the dental component, in accordance with an example of the present disclosure.

FIGS. 3A-D illustrate various view of the dental component 16 according to one example. FIG. 3A illustrates a partial cross-sectional view of the dental component 16, FIG. 3B illustrates a perspective view of a partial cross-sectional view of the dental component 16, FIG. 3C illustrates a bottom-up view of the dental component 16, and FIG. 3D illustrates a top-down view of the dental component 16.

The dental component 16 (also herein "component 16") can have a bore 52 extending through the dental component 16. The bore 52 can include a screw head portion 54, an interference portion 56, and an engagement portion 58 comprising an engagement wall 59. The screw head portion 54 can terminate at a shoulder 60 that is configured to abut the transition surface 37 of the screw 18, when fully seated. The interference portion 56 can comprise an offset passage relative to the head portion 54 and/or the engagement portion 58. The interference portion 56 can be defined at least partially, by an interference wall 62 extends from the shoulder 60 along less than the full circumference of the shoulder 60. The interference wall 62 extends from a proximal surface 63 to distal surface 61 defining an interference ledge 64. The interference ledge 64 is positioned proximal from the distal end 36 of the dental component 16. As discussed herein, the interference ledge 64 is configured to abut the interference shoulder 50 when a removal torque is applied to the screw 18 to pop-off (i.e., decouple) the dental component 16 from the dental implant 12, The interference ledge 64 can have a crescent shape due to offset with the interference wall 62, interference portion 56 and head portion 54. While shown as a flat surface perpendicular to a longitudinal axis, the interference ledge 64 can be angled from the longitudinal axis, be curved, or have oilier geometries.

In one example, the proximal surface 63 can be positioned along the same plane as the shoulder 60. In another example, the proximal surface 63 can taper from the shoulder 60. As seen in 3C and 3D, the interference wall 62 defines a central axis 66. The screw head portion 54 and the engagement portion 58 have a central axis 65, which is offset from a central axis 66 of the interference wall 62. The central axis 65 of the screw head portion 54 and the engagement portion 58 align with and can also be referred to as a central axis of the dental component 16.

A diameter D3 of the interference wall 62 is less than a diameter D4 of the engagement portion 58. Further, a diameter D2 of the screw head portion 54 is greater than the diameter D3 of the interference wall 62 and the diameter D4 of the engagement portion 58. As discussed herein, the interference ledge 64 is configured to engage the interference shoulder 50 when removal torque is applied to the screw 18 and the screw 18 moves in a proximal direction.

FIGS. 4A and 4B illustrate the dental implant system 10 according to one example. During use, the screw 18 is inserted through the dental component 16. As seen in FIG. 4A, the screw 18 is inserted through the dental component 16. When the engagement portion 47 is positioned within the interference portion 56, the center axis 70 of the screw 18 is aligned with the interference portion center axis 66, which is offset from the center axis 65 of the dental component 16. Once the engagement portion 47 and the interference shoulder 50 are advanced past (i.e., clear) the interference portion 56, the screw 18 can be inserted into the dental implant 10. When the threads 48 engage the threaded portion 28 of the dental implant, the central axis 70 of the screw 18 is aligned with the dental component central axis 65.

Figure 5A:
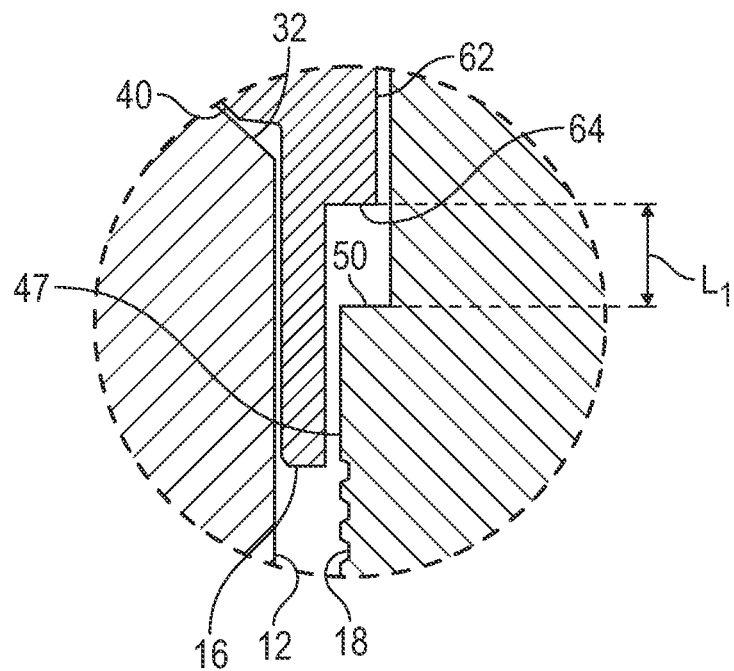
FIG. 5A is a close-up view of a section A in FIG. 4B, in accordance with an example of the present disclosure.
Figure 5B:
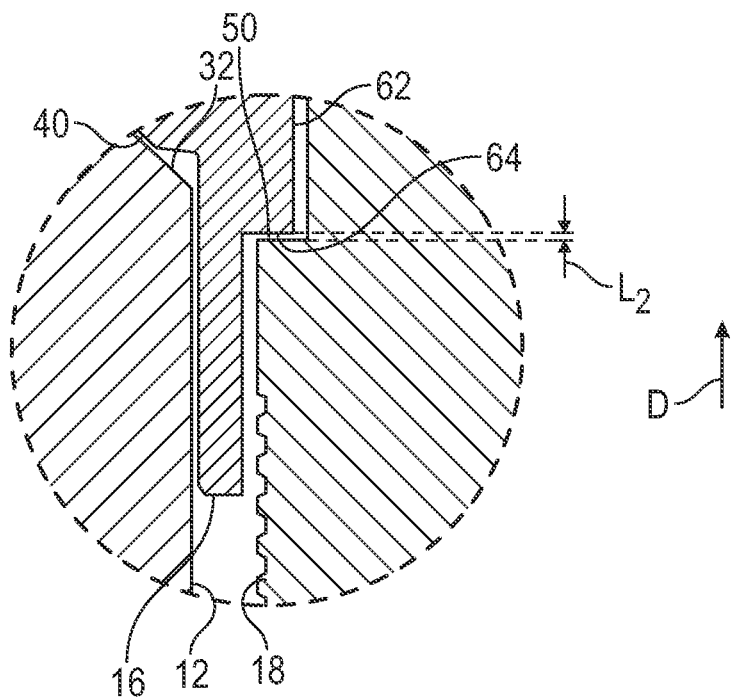
FIG. 5B is the close-up view of the section A in FIG. 4B when the dental component is being separated from the dental implant.

FIG. 4B illustrates the dental component 16 fully seated on the dental implant 12. Lobes 45 on the head 44 of the screw 18 can assist the user when removing the prosthetic assembly 14 from the dental implant 12. For example, the lobes 45 can provide support as a removal torque is applied to the screw 18. As discussed herein, one or more lobes 45 can be used. In one example, two lobes 45 are used. In another example, three lobes 45 can be equidistantly positioned around the head 44 of the screw 18. FIGS. 5A and 5B illustrate close-up views of section A in FIG. 4B. FIG. 5A illustrates the dental component 16 fully seated on the dental implant 12. When fully seated, the interference ledge 64 and the interference shoulder 50 are longitudinally spaced apart by a length L1.

FIG. 5B illustrates the dental component 16 after removal torque has been applied to the screw 18. When the screw 18 receives the removal torque, the screw 18 moves in a proximal direction "D" causing the distance between the interference ledge 64 and interference shoulder 50 to decrease from length "L1" (FIG. 5A) to length "L2" (FIG. 5B). The interference shoulder 50 of the screw 18 eventually abuts the interference ledge 64 of the dental component 16. For example, the length between the interference ledge 64 and the interference shoulder 50 is less in FIG. 5B, after removal torque has been applied, compared to the length L1 in FIG. 5A. Once the interference shoulder 50 abuts the interference ledge 64 the screw 18 transmits part of the removal torque to the dental component 16, in the form of a force in the proximal direction "D", which is the direction of the that the dental component 16 will "pop-out".

Figure 6:
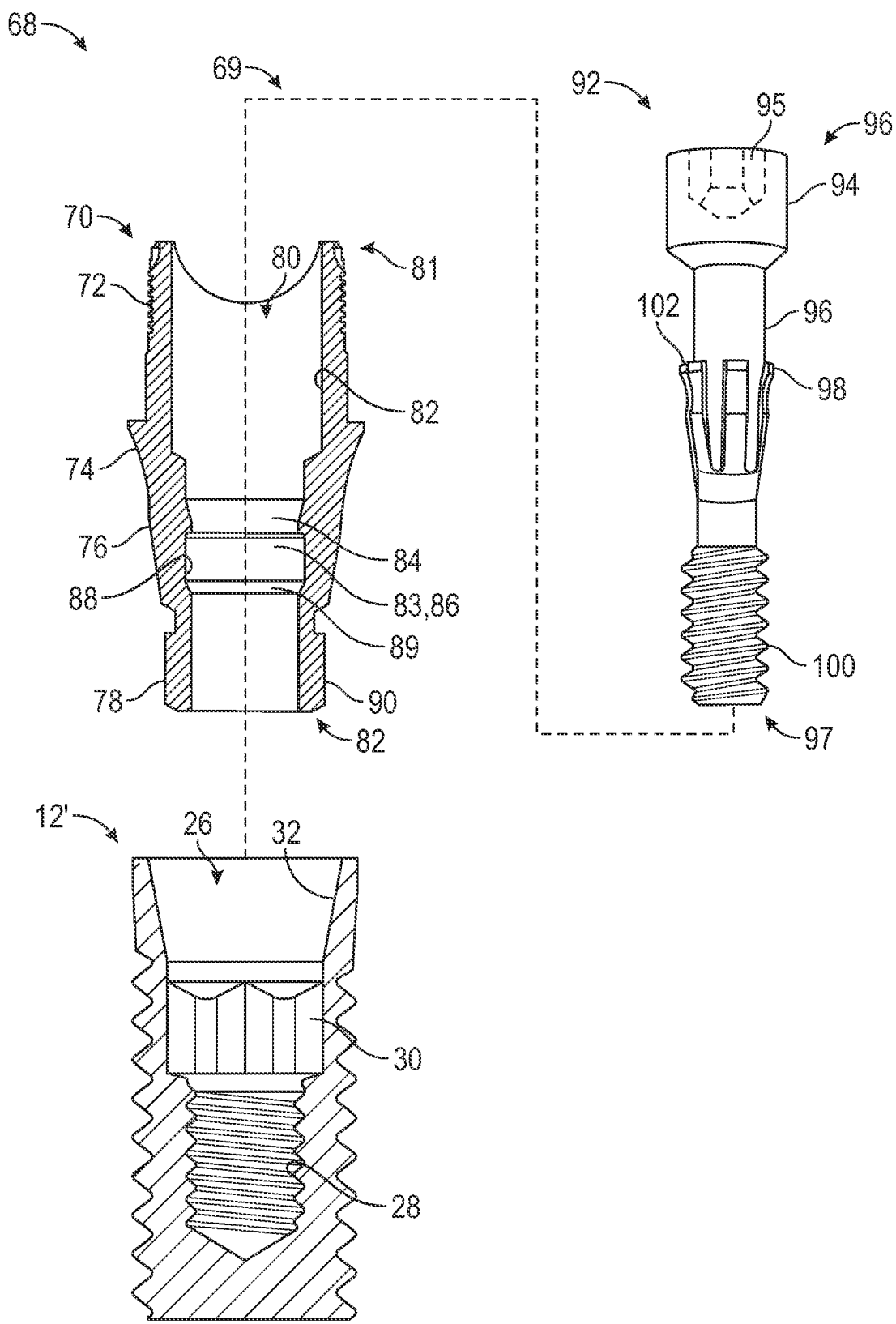
FIG. 6 is an exploded view of a dental implant system, in accordance with an example of the present disclosure.
Figure 7:
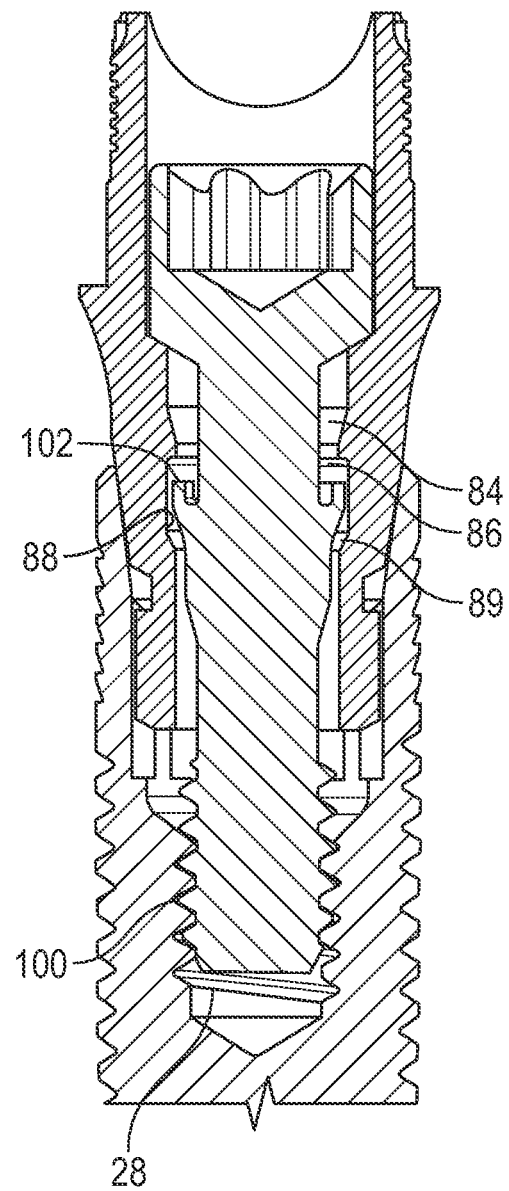
FIG. 7 is an assembled view of the dental implant system in FIG. 6, in accordance with an example of the present disclosure.
Figure 8:
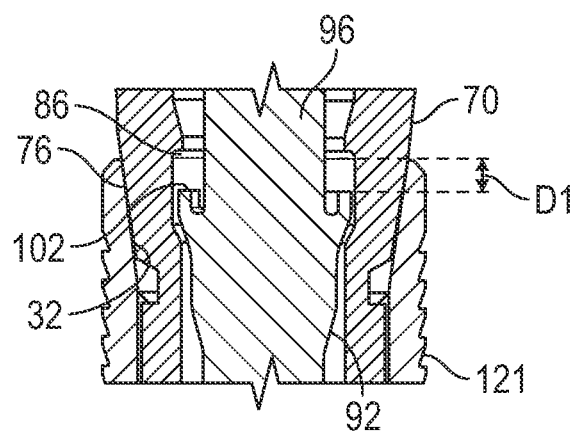
FIG. 8 is a close-up view of a portion of the assembled view of the dental implant system in FIG. 7, in accordance with an example of the present disclosure.

FIGS. 6-8 illustrate another example of a dental implant system 68, in accordance with an example of the present disclosure. FIG. 6 is an exploded view of a dental implant system 68 according to an example of the present disclosure. FIG. 7 is the dental implant system 68 in FIG. 6 assembled. FIG. 8 is a close-up of a portion of the assembled dental implant system 68. The dental implant system 68 can include a dental implant 12' and a prosthetic assembly 69. The prosthetic assembly 69 can include a dental component 70 and a retention screw 92 (also herein "screw 92"). The implant 12' is configured to be screwed into the bone of a patient and the dental component 70 is configured to be connected to the implant 12'. Similar to the dental implant system 10, the screw 92 can be used to separate the dental component 70 from the dental implant 12', when a removal force is applied to the screw 92.

The dental component 70 can extend from a proximal end 81 to a distal end 82. The dental component 70 can include a post 72, an emergence profile 74, an implant engagement surface 76, an anti-rotation portion 78, and a bore 80 extending therethrough. When coupled together, the anti-rotation portion 78 of the dental component 70 is received within the anti-rotation chamber 30 of the implant 12' to rotationally lock the dental component 70 to the implant 12'. The bore 80 includes a screw head portion 82, an interference portion 83, and a distal portion 90. An interference ridge 84 extends inward toward a longitudinal axis of the dental component 70. The interference ridge 84 extends distally and tapers toward the longitudinal axis. The interference ridge 84 defines an interference shoulder 86. The interference shoulder 86 is adjacent to the interference chamber 88. The interference chamber 88 extends from the interference shoulder 86 to a support surface 89.

The screw 92 extends from a proximal end 96 to a distal end 97. The screw 92 can include a head 94, a shaft 96, a plurality of flexible interference fingers 98, and a threaded portion 100. The plurality of flexible interference fingers 98 (also referred to herein as "fingers 98") can be positioned between the threaded portion 100 and the shaft 96. The fingers 98 define an interference surface 102 spaced a distance ("D1") from the interference shoulder 86. The interference surface 102 is configured to engage the interference shoulder 86 during separation of the dental component 70 and the dental implant 12'. The fingers 98 have an uncompressed and compressed state. At the uncompressed state, a diameter of the plurality of fingers 98 is greater than a diameter of the shaft 96. Additionally, the diameter of the fingers 98 at the uncompressed state is greater than a minimum diameter of the interference ridge 84.

During assemble of the screw 92 and the dental component 70, the pliable fingers 98 bend inward to a compressed state to allow the screw 92 to pass through the dental components 70 internal diameter. That is, the pliable fingers 98 are compressed as they pass the interference ridge 84. Once the pliable fingers 98 pass the interference ridge 84, the pliable fingers 98 transition back to the uncompressed state where the diameter of the pliable fingers 98 is greater than the diameter of the interference ridge 84. As seen in FIGS. 7 and 8, the pliable fingers 98 are positioned within the interference chamber 88. A surface of the fingers 98 can engage the support surface 89 of the dental component 70.

When the dental component 70 needs to be removed, a removal torque is applied to the screw 92, as discussed herein. As the screw 92 moves proximally the interference surface 102 of the pliable fingers 98 push up on the interference shoulder 86 to overcome the friction fit of the dental component 70 with the dental implant 12'. After the dental component 70 is separated from the implant 12', the screw 92 cannot be removed from the dental component 70.

Figure 9:
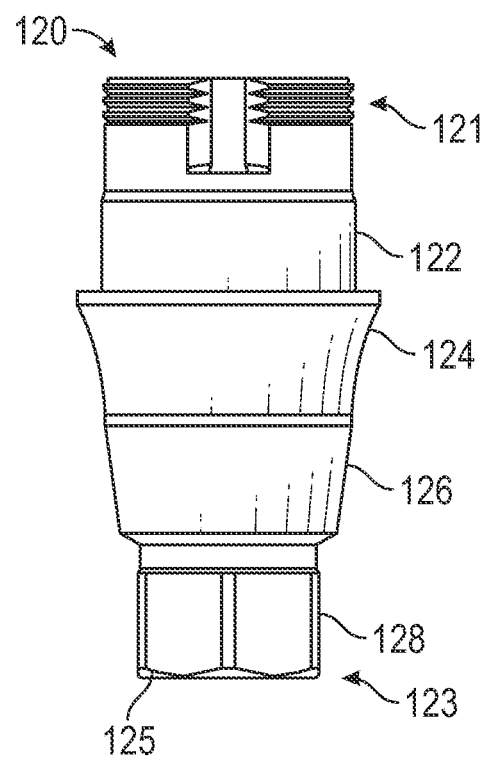
FIG. 9 is a side view of a dental component, in accordance with an example of the present disclosure.
Figure 10:
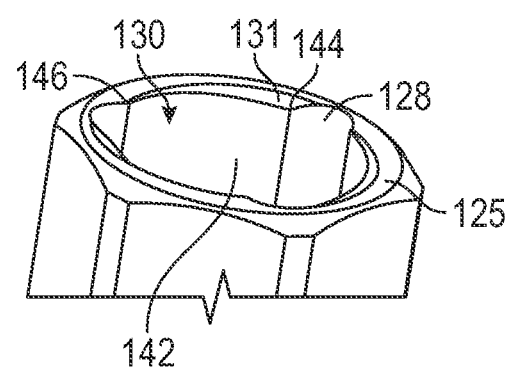
FIG. 10 is a perspective view of a portion of the dental component shown in FIG. 9, in accordance with an example of the present disclosure.
Figure 11:
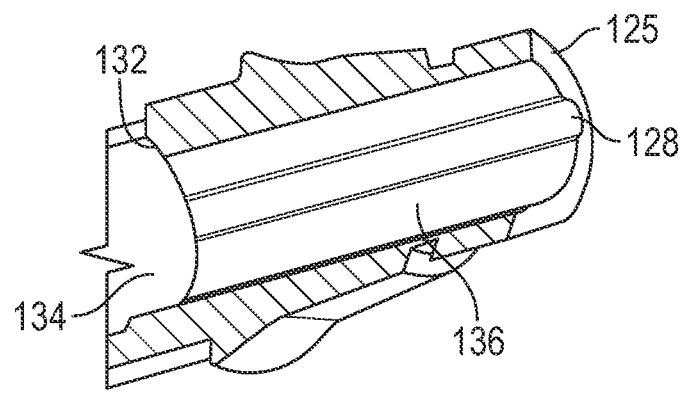
FIG. 11 is a perspective cross-sectional view of the dental component, in accordance with an example of the present disclosure.

FIGS. 9-14 illustrate another example of a dental implant system, in accordance with an example of the present disclosure. FIG. 9 is side view of a dental component 120 according to an example of the present disclosure. FIG. 10 is a perspective view of a distal portion of the dental component 120 in FIG. 9. FIG. 11 illustrates a perspective cross-sectional view of the dental component 120. FIGS. 12A and 12B illustrate a retention screw 150 according to an example of the present disclosure. FIG. 13 illustrates an assembled view of the dental component 120 and the retention screw 150. FIG. 14 illustrates a cross-sectional view of the assembled dental implant system 127 including the dental implant 12', the dental component 120, and the retention screw 150. Similar to the dental implant systems 10 and 68, the screw 150 can be used to separate the dental component 120 from the dental implant 12', when a removal force is applied to the screw 150.

The dental component 120 can extend from a proximal end 121 to a distal end 123. The distal end 123 defines an interference surface 125. The dental component 120 can include a post 122, an emergence profile 124, an implant engagement surface 126, and channels 128, and a bore 130 extending therethrough. The bore 130 includes a screw head portion 134 and an interference portion 136. The interference portion 136 includes one or more channels 128 extending along the interference portion 136. That is, the one or more channels 128 extend from a shoulder 132 to the interference surface 125.

In an example, the interference surface 125 includes a spiral relief 131. The spiral relief 131 includes a tapered curved surface 142 extending from a first edge 146 of a channel 130. In the example shown in FIG. 10, the dental component 120 includes three channels 128 and the spiral relief 131 extends from a first edge 146 of a first channel 128 to a second edge 144 of a second channel 130. A thickness of the interference surface 125 increases for the first edge 146 to the second edge 144. That is, each channel 128 includes a first edge 146 (from which the spiral relief 131 is the thinnest) and a second edge 144 (where a spiral relief 131 is the thickest).

The screw 150 extends from a proximal end 151 to a distal end 152. The screw 150 can include a head 153, a shaft 154, one or more protrusions 156, and a threaded portion 158. The plurality of protrusions 156 extend radially from the shaft 154 and are positioned adjacent to the threaded portion 158.

The protrusions 156 on the screw 150 allow the screw to be assembled/disassembled with the dental component 120 at a limited window of relative axial rotation. The one or more protrusions 156 can align with the one or more channels 128. Any number of protrusions 156 and channels 128 can be used as long as they equal each other. During assembly of the screw 150 and the dental component 120, the protrusions 156 are aligned with the channels 128 and the screw 150 is advanced until the screw head 153 contacts the shoulder 132. As seen in FIG. 13, the distal end of the screw 150 can extend beyond the interference surface 125 of the dental component 120 such that that the protrusions 156 also extend beyond the interference surface 125.

As discussed herein, to couple the dental component 120 to the implant 12', the screw 150 can engage the threads of the implant 12'. When the dental component 120 needs to be removed, a removal force can be applied to the screw 150, as discussed herein, and the screw can rotate counterclockwise. During this rotation, the spiral reliefs 131 on the interference surface 125 "catch" the protrusions 156 on the screw 150 and prevent the protrusions 156 from entering the channels 128. The spiral reliefs 131 mitigate the screw 150 from disassembling from the dental component 120 while the protrusions 156 are pushing on the interference surface 125 to overcome the friction fit of the dental component 120 to the implant 12'. After the dental component 120 is separated from the implant, the screw 150 can be removed from the dental component 120, if needed.

Figure 16:
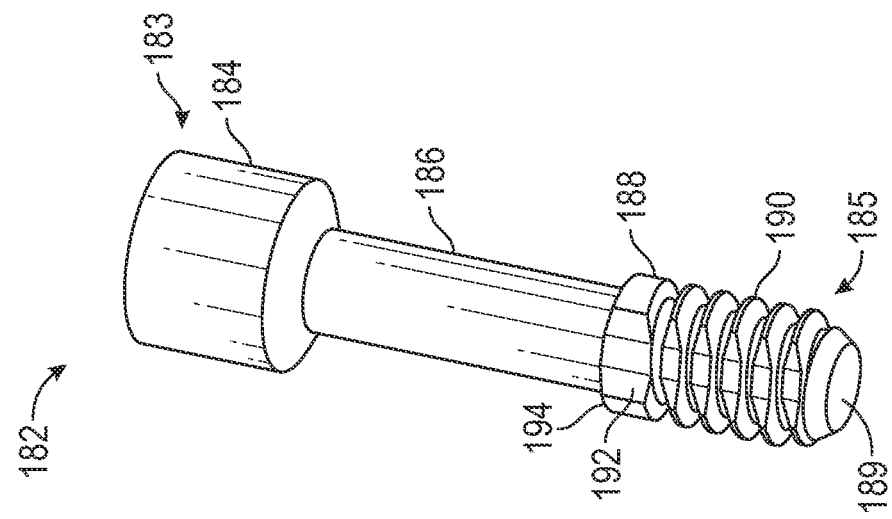
FIG. 16 is a perspective view of a retention screw of the dental implant system in FIG. 15, in accordance with an example of the present disclosure.
Figure 15:
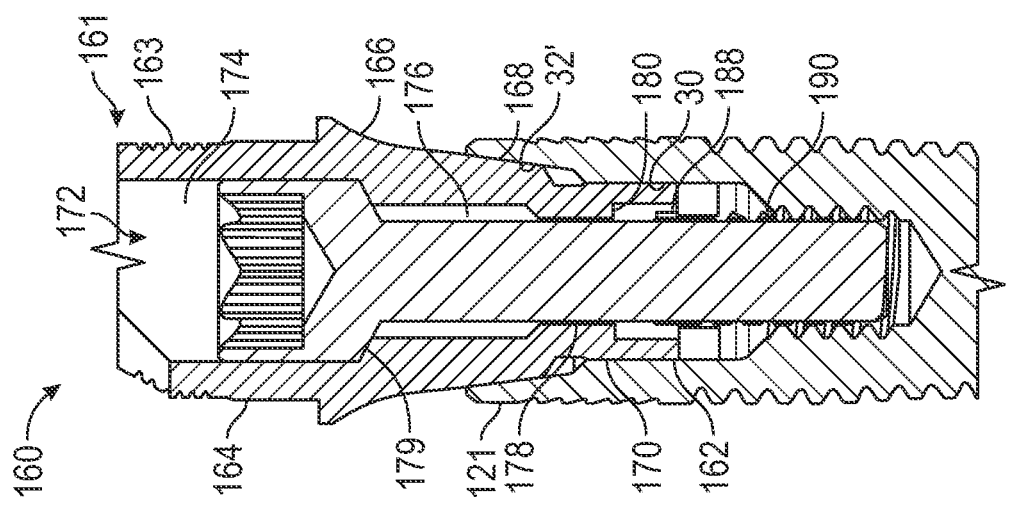
FIG. 15 is an assembled view of another example of a dental implant system, in accordance with an example of the present disclosure.
Figure 17:
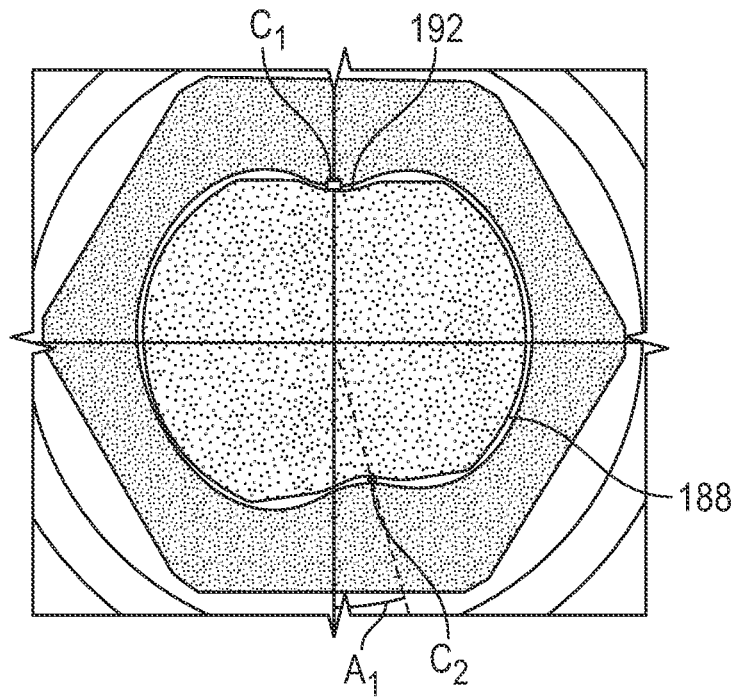
FIG. 17 is a cross-sectional view along a portion of the retention screw shown in FIG. 16.

FIGS. 15-17 illustrate another example of a dental implant system 160, in accordance with an example of the present disclosure. FIG. 15 is an assembled view of the dental implant system 160. FIG. 16 is a perspective view of a retention screw 182. FIG. 17 illustrates cross-sectional view along a portion of the retention screw 182. Similar to the dental implant systems 10, 68, and 127, the screw 182 can be used to separate the dental component 164 from the dental implant 12', when a removal force is applied to the screw 182.

The dental component 164 can extend from a proximal end 161 to a distal end 162. The dental component 164 can include a post 163, an emergence profile 166, an implant engagement surface 168, an anti-rotation portion 170, and a bore 172 extending therethrough. The bore 172 includes a screw head portion 174 and an interference portion 176. The interference portion 176 includes a projection 178 extending toward a longitudinal axis of the dental component 164. The projection 178 defines an interference ledge 180. As discussed herein, a shape of the projection 178 corresponds to a shape of a threaded portion 190 and an interference rim 188 of the retention screw 182.

The screw 182 extends from a proximal end 183 to a distal end 185. The screw 182 can include a head 184, a shaft 186, an interference rim 188, and a threaded portion 190. The interference rim 188 can define an interference shoulder 194 that is configured to contact the interference ledge 180 during removal of the dental component 164 from the implant 12'.

Figure 17A:
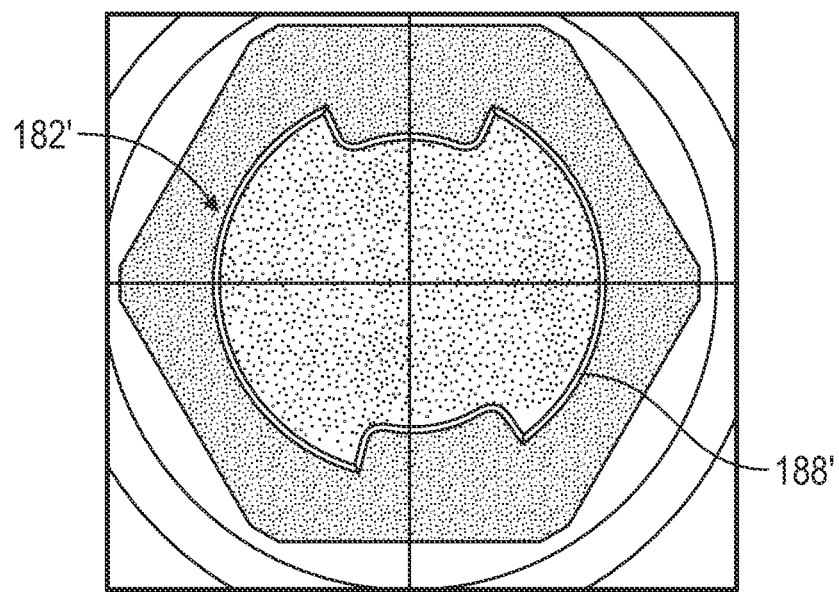
FIG. 17A is a cross-sectional view along a portion of an alternative example of the retention screw.

The interference rim 188 and the threaded portion 190 include at least one groove 192 (or flat) extending from the interference ledge 180 to a distal surface 189 of the screw 182. FIG. 17 illustrates a cross-section view along the interference rim 188. As seen in FIG. 17, a center C1 of one groove 192 is offset from a center C2 of another groove 192. In one example, the center C2 of the second groove 192 can be offset by an angle A1. In one example, A1 can be about 10 degrees. The interference ridge 178 has a shape that matches the shape of the interference ridge 187 and threaded portion 190. That is the number and shape of the grooves/flats 192 on the screw 182 match the number and shape of the grooves on the interference ridge 178. FIG. 17A illustrates a cross-section view along the interference rim 188' formed by broaching the screw 182' rather than milling as is the case with the example of screw 182 in FIG. 17.

The corresponding shape of the interference ridge 178 with the interference rim 188 and threaded portion 190 allows the screw to be assembled/disassembled with the dental component 164 at a limited window of relative axial rotation. Thus, the screw 182 can be aligned with the interference ridge 178 to allow the threaded portion 190 and the interference rim 188 to pass. The dental component 164 can be coupled to the implant via the screw 182. Any number of grooves 192 as long as the interference ridge 178 has a corresponding shape including the same number of protrusions.

During assembly of the screw 182 and the dental component 164, the shape of the interference rim 188 and threaded portion 190 are aligned with the corresponding shape of the interference ridge 178 and the screw 150 is advanced through the dental component 164 until the interference rim 188 has cleared the interference ridge 178. Then, the dental component 164 and the screw 182 can be coupled to the implant 12'.

As discussed herein, to couple the dental component 164 to the implant 12', the screw 182 can engage the threads of the implant 12'. When the dental component 164 needs to be removed, a removal force can be applied to the screw 182, as discussed herein, and the screw 182 can rotate counterclockwise. During this rotation, the interference shoulder 194 can engage the interference ledge 180 and push up (proximally) on the dental component 164 to overcome the friction fit of the dental component 164 to the implant 12'. After the dental component 164 is separated from the implant, the screw 182 can be removed from the dental component 120, if needed.

Figure 18C:
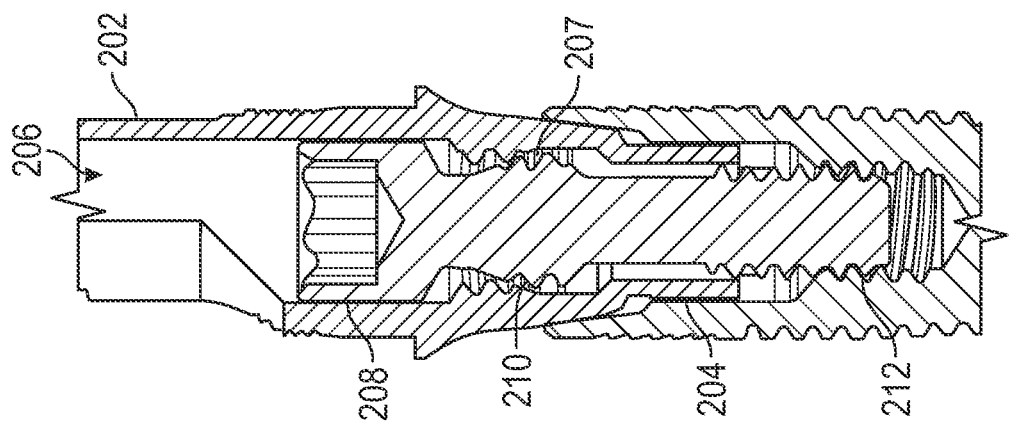
FIG. 18C is a partial cross-section of removing the dental component from the dental implant, in accordance with an example of the present disclosure.
Figure 18B:
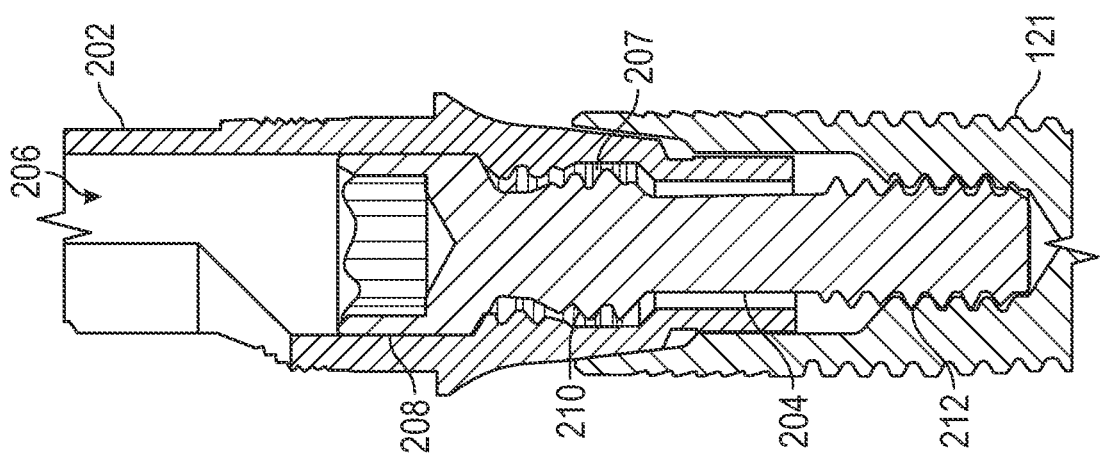
FIG. 18B is a partial cross-section of the dental component in FIG. 18A fully seated on the dental implant, in accordance with an example of the present disclosure.
Figure 18A:
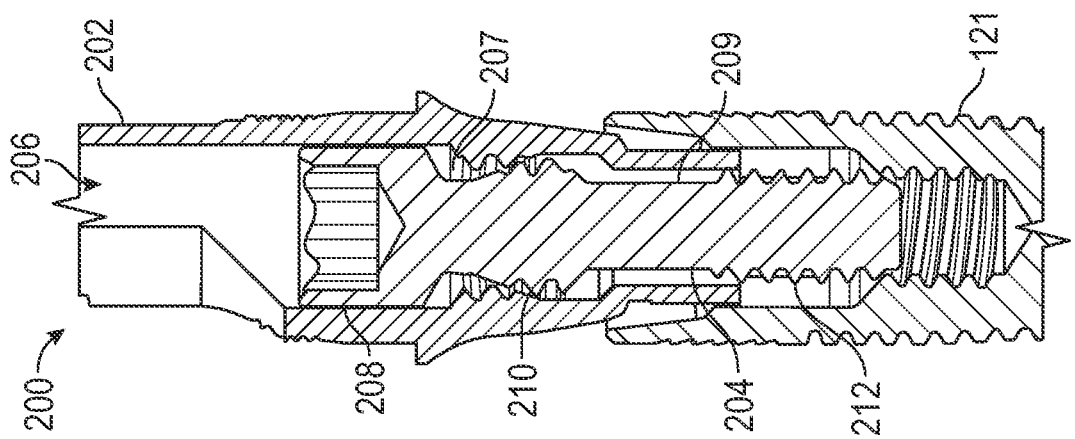
FIG. 18A is a partial cross-section view of an assembled dental component and screw being inserted into a dental implant, in accordance with an example of the present disclosure.

FIGS. 18A-C illustrate another example of a dental implant system 200, in accordance with an example of the present disclosure. FIG. 18A is a partial cross-section view of an assembled dental component 202 and screw 204 being inserted into a dental implant 12'. FIG. 18B is a partial cross-section of the dental component 202 fully seated on the dental implant 12'. FIG. 18C is a partial cross-section of removing the dental component 202 from the dental implant 12'.

The dental component 202 can have all the features described herein with dental components, however, the dental component 202 includes a bore 206 that has a threaded interference portion 207. The screw 204 includes a head 208, a shaft 209, a coronal threaded portion 210 and an apical threaded portion 212. The apical threaded portion 212 includes a right-handed thread that engages the implant 12'. The coronal threaded portion 210 includes a left-handed thread with a major diameter that is greater than a major diameter of the apical threaded portion 212.

The coronal thread portion 210 retains the screw 204 within the dental component 202 with the dental component's 202 corresponding left-handed internal thread along the threaded interference portion 207. That is, when left-rotation is applied to the screw 204, the coronal thread portion 210 engages the left-handed internal thread of the threaded interference portion 207 and advances the screw 204 through the threaded interference portion 207. To couple the dental component 202 to the implant 12', right-rotation is applied to the screw 204 to advance the apical threaded portion 212 within the threaded portions of the implant 12'.

When the dental component 202 needs to be removed left-rotation can be applied to the screw 204 to reverse the apical threaded portion 212 from the threads of the implant 12'. During the left-rotation of the screw 204, the coronal threaded portion 210 does not engage the threaded interference portion 207. Therefore, the screw 204 pushes the dental component up (proximally/coronally) to overcome the friction fit. After the dental component 202 is separated from the implant 12', the screw 204 can be removed from the dental component 202, if needed.

Figure 19C:
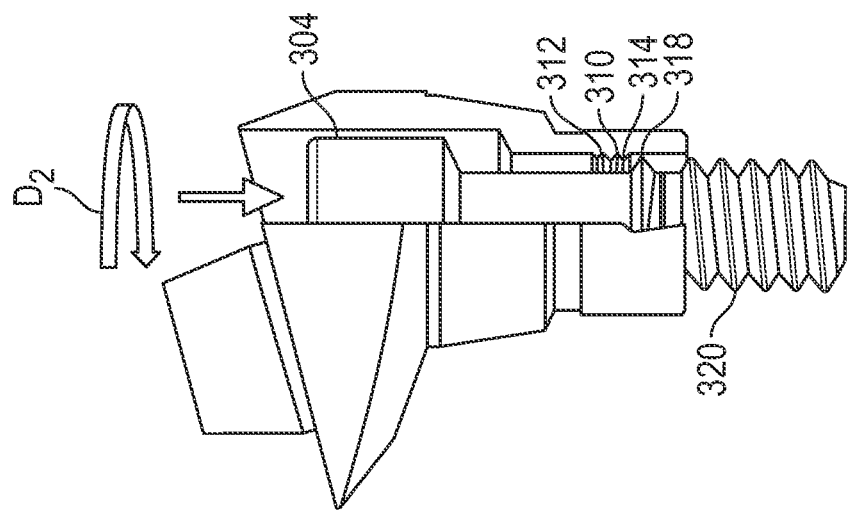
FIG. 19C is a partial cross-section view of assembling a screw 304 to a dental component 302, in accordance with an example of the present disclosure.
Figure 19B:
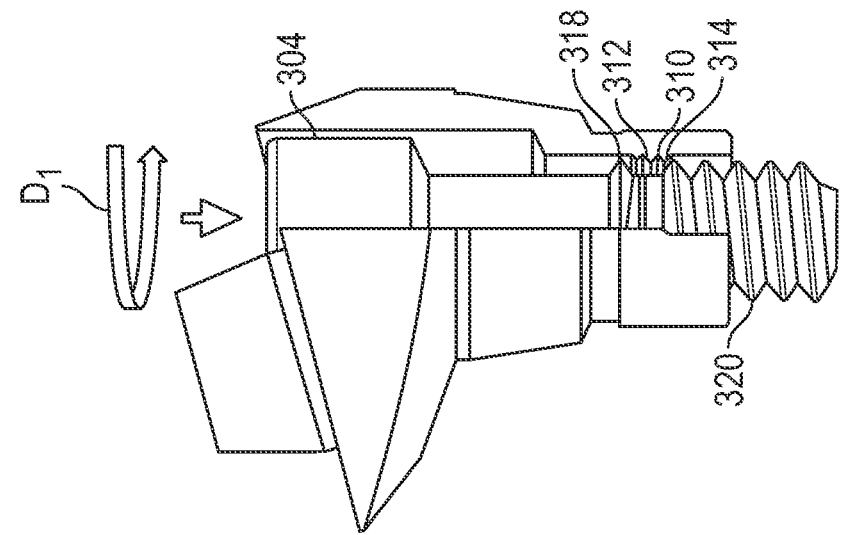
FIG. 19B is a partial cross-section view of assembling a screw 304 to a dental component 302, in accordance with an example of the present disclosure.
Figure 19A:
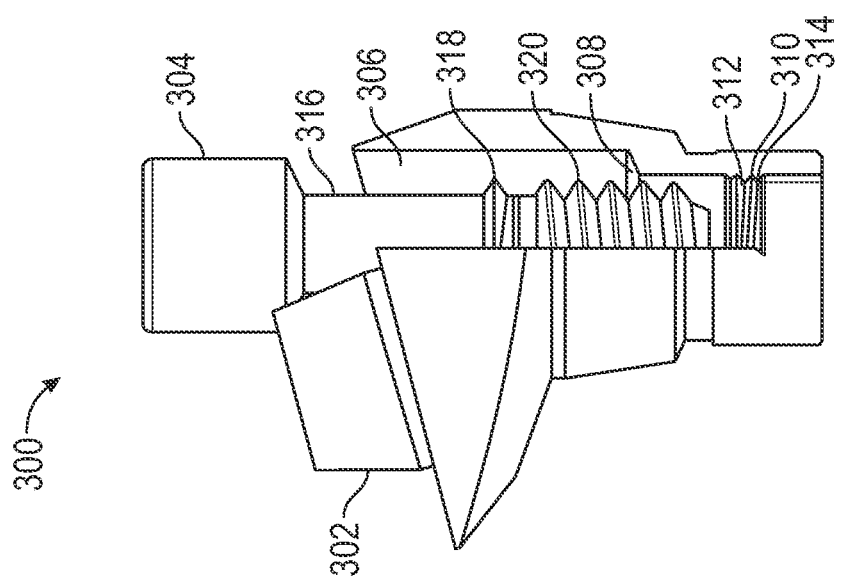
FIG. 19A is a partial cross-section view of assembling a screw 304 to a dental component 302, in accordance with an example of the present disclosure.

FIGS. 19A-C illustrate another example of a dental implant system 300, in accordance with an example of the present disclosure. FIGS. 19A-C are partial cross-section views of assembling a screw 304 to a dental component 302.

The dental component 302 can include a bore 306 that has a shoulder 308 to contact a head of the screw 304 when fully seated. The bore 306 can include a threaded interference portion 310 that includes a coronal thread 312 having a left-handed thread and an apical thread 314 having right-handed thread. The screw 204 can include a shaft 316 having a coronal thread 318 having a left-handed thread and an apical thread 320 having a right-handed thread.

To couple the screw 304 to the dental component 302, two different rotations need to be performed. First, as illustrated in FIG. 19B, a right-rotational force ("D1") applied to the screw advances the apical thread 32 through the apical thread 314 of the threaded interference portion 310. Second, as illustrated in FIG. 19C, a left-rotational force ("D2") applied to the screw 304 advances the coronal thread 318 through the threaded interference portion 310. Once the screw 304 is retained within the dental component 302, the screw 304 can be rotated to engage threads of the dental implant 12'.

FIG. 19C illustrates removing the dental component 302 from the dental implant 12'. By applying left-hand rotation to the screw 304, the apical thread 320 will move coronally with respect to the dental implant 12'. The coronal thread 318 does not engage the threaded interference portion 310. Therefore, the screw 304 pushes the dental component 302 up (proximally/coronally) to overcome the friction fit. After the dental component 302 is separated from the implant 12', the screw 304 can be removed from the dental component 302, if needed.

Figure 21B:
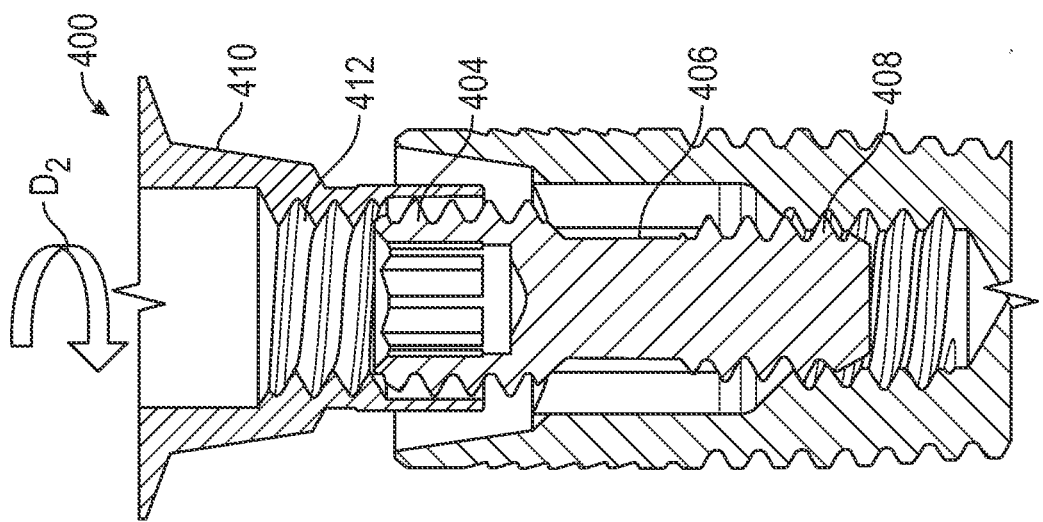
FIG. 21B is a partial cross-section view of the dental implant system shown in FIG. 21A while removing the dental component from the dental implant, in accordance with an example of the present disclosure.
Figure 21A:
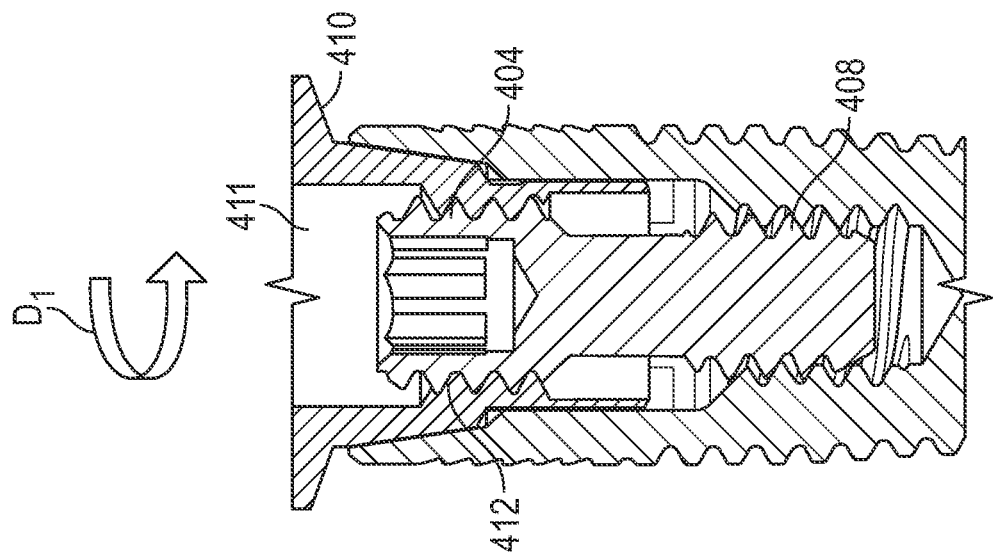
FIG. 21A is a partial cross-section view of a dental implant system including the dental implant and the screw in FIG. 20 as well as a dental component, in accordance with an example of the present disclosure.
Figure 20:
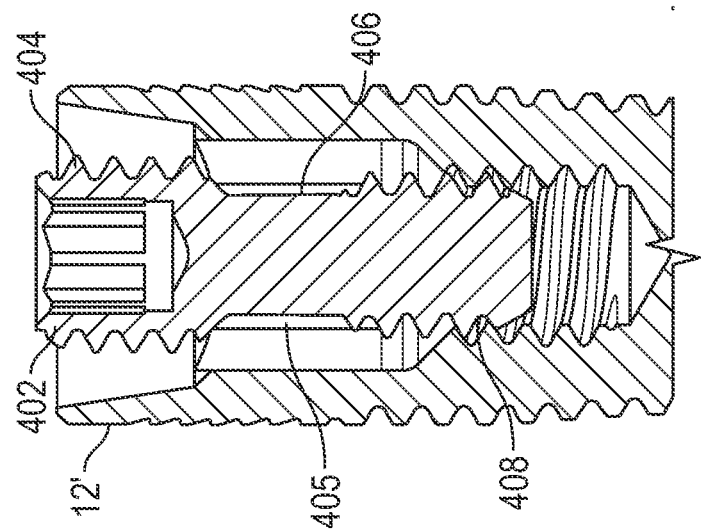
FIG. 20 is a partial cross-section view a dental implant and a screw, in accordance with an example of the present disclosure.

FIGS. 20-21B illustrate another dental implant system 400, in accordance with an example of the present disclosure. FIG. 20 is a partial cross-section view a dental implant and a screw, in accordance with an example of the present disclosure. FIG. 21A is a partial cross-section view of a dental implant system including the dental implant and the screw in FIG. 20 as well as a dental component, in accordance with an example of the present disclosure. FIG. 21B is a partial cross-section view of the dental implant system shown in FIG. 21A while removing the dental component from the dental implant, in accordance with an example of the present disclosure.

In the example shown in FIGS. 20-21B, the screw 402 is coupled to the implant 12' first. The screw 402 includes a coronal threaded portion 404, a shaft 405, and an apical threaded portion 408. The coronal threaded portion 404 has a left-handed thread and the apical threaded portion 408 has a right-handed thread. The apical threaded portion 408 engages the threads of the dental implant 12'. The dental component 410 is placed onto the screw 402 to assemble the dental component 410 to the implant 12'. In an example, the dental component 410 includes a bore 411 having a threaded portion 412. Rotating the screw 402 clockwise (right-handed rotation) draws the dental component 410 and the implant together.

When separating the dental component 410 from the dental implant 12' is necessary, the screw 402 can be rotated counterclockwise left-handed rotation) such that apical threaded portion 408 will move coronally with respect to the implant 12'. Since the coronal threaded portion 404 will not move relative to the threaded portion 412 of the dental component 410, the dental component 410 and the dental implant 12' will be pushed apart. After the dental component 410 is separated from the implant 12', the screw 402 can be removed from the dental component 302, if needed.

Figure 22:
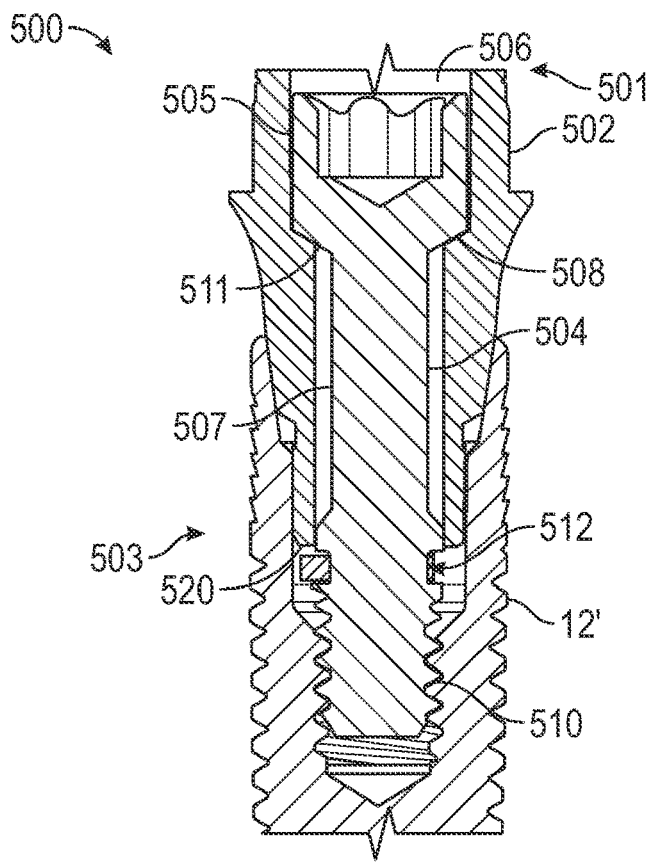
FIG. 22 is a partial cross-section view another example of a dental implant system, in accordance with an example of the present disclosure.
Figures 23, 24:
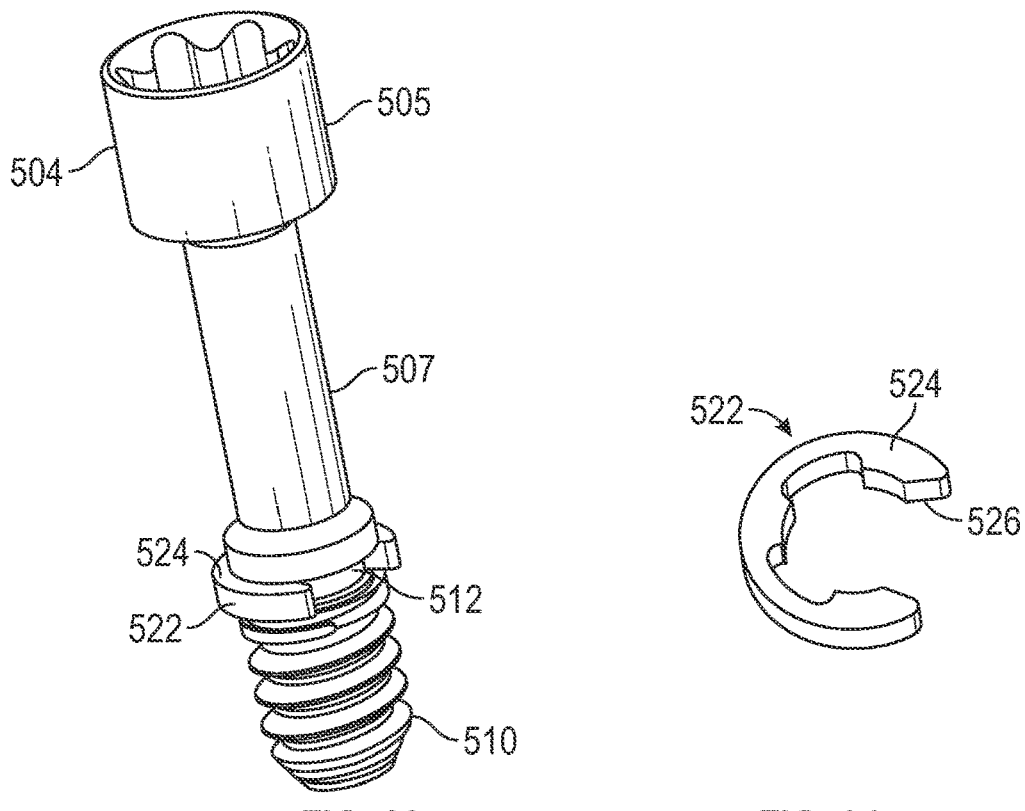
FIG. 23 is a perspective view of a screw and a c-clip of the dental implant system shown in FIG. 22, in accordance with an example of the present disclosure.
FIG. 24 is a perspective view of the c-clip shown in FIGS. 22 and 23.

FIGS. 22-24 illustrate another dental implant system 500, in accordance with an example of the present disclosure. FIG. 22 is a partial cross-section of the assembled dental implant system 500. The dental implant system 500 can include a dental implant 12', a dental component 502, and a screw 504. The dental component 502 extends from a proximal end 501 to a distal end 503 having an interference surface 520. The dental component 502 can include a bore having a shoulder 508. The screw 504 can include a head 505, a shaft 507, a threaded portion 510, and an interference groove 512 positioned between the shaft 507 and the threaded portion 510. As seen in FIG. 22, when the dental component 502 is fully seated, the shoulder 508 of the dental component 502 can engage a surface 511 of the screw 504.

The interference groove 512 is configured to receive a flexible c-clip 522 that clips over the interference groove 512, as shown in FIG. 23, The flexible c-clip 522 has an interference surface 524 (e.g., top surface) and a bottom surface 526 opposite the interference surface 524. During assembly, the screw 504 is inserted through the dental component 502 and then the c-clip is attached to the interference groove 512, while the interference groove 512 extends beyond the distal end 503 of the dental component 502. The dental component 502 can be coupled to the dental implant 12' via screw 504, while the c-clip 522 is attached to the screw 504. Once assembled, the screw 504 will be retained within the dental component 502 since the outer diameter of the c-clip is larger than the through hole of the dental component 502.

During removal, the interference surface 524 will push on the interference surface 520 of the dental component 502 to overcome the friction such that the dental component is separated from the dental implant 12'. The c-clip 522 can be disassembled form the screw allowing the screw 504 to be disassembled from the dental component 502.

Figure 25:
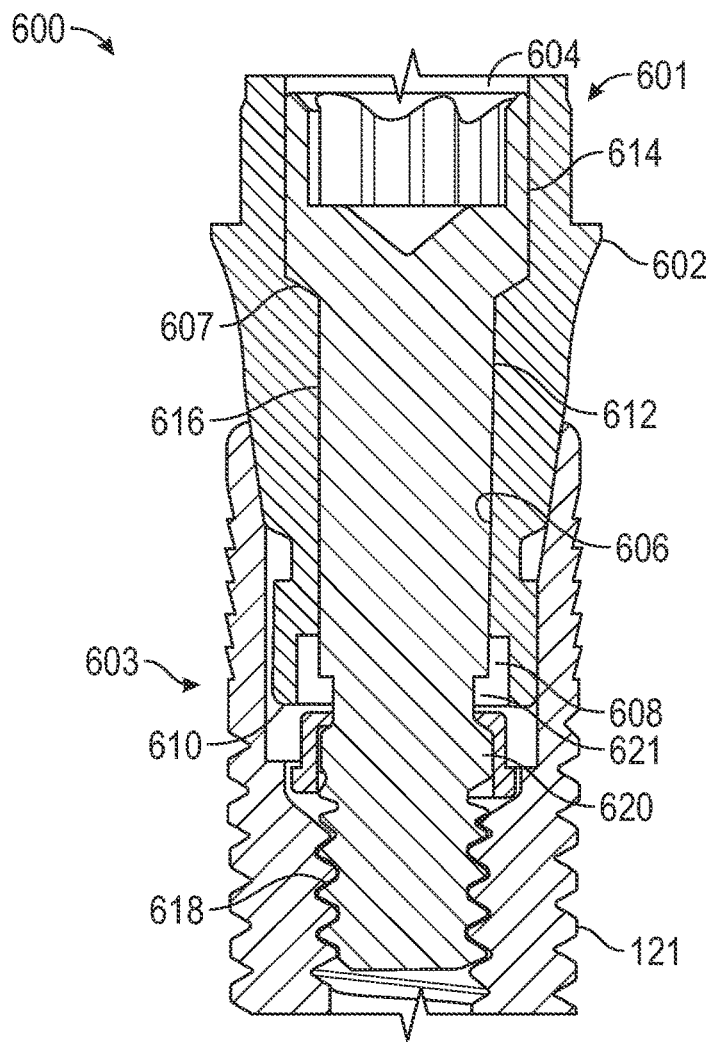
FIG. 25 is a partial cross-section view another example of a dental implant system, in accordance with an example of the present disclosure.

FIGS. 25-27B illustrate another dental implant system 600, in accordance with an example of the present disclosure. FIG. 25 is a partial cross-section of the assembled dental implant system 600. The dental implant system 600 can include a dental implant 12', a dental component 602, and a screw 606. The dental component 602 extends from a proximal end 601 to a distal end 603 having an interference surface 610. The dental component 602 can include a bore 604 having a shoulder 607 to engage a surface of the screw 606. The bore 604 can include an interference chamber 608.

Figure 26:
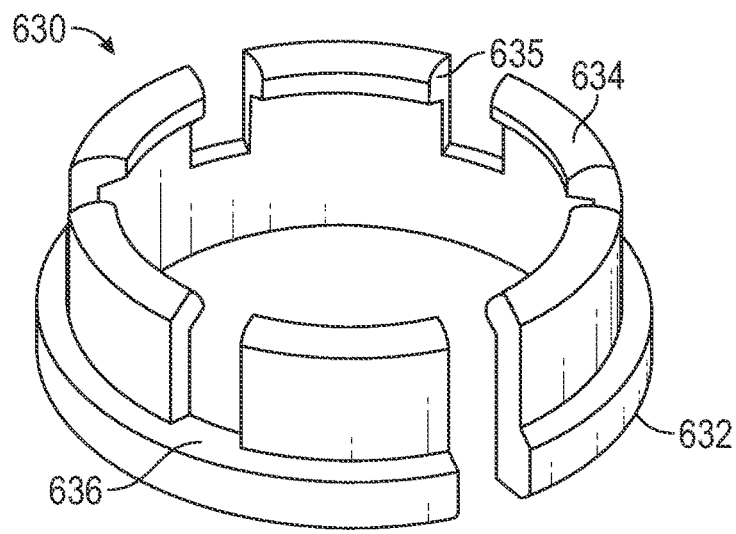
FIG. 26 is a perspective view of an interference ring of the dental implant system of FIG. 25, in accordance with an example of the present disclosure.

The screw 606 can include a head 614, a shaft 616, a threaded portion 618, and an interference protrusion 620 and a groove 621. Similar to the example shown in FIGS. 22-24, the screw 606 is inserted through the dental component 602 first. After the screw 606 is inserted through the dental component 602, an interference ring 630 can be coupled to the screw 606. FIG. 26 illustrates a perspective view of the interference ring 630. As shown, the interference ring 630 is a split ring having a base 632 and a plurality of flexible fingers 634 extending coronally from the base 632. The base 632 defines an interference surface 636 that can engage the interference surface 610 during removal.

When coupled to the screw 606, a protrusion 635 of the plurality of fingers 634 engage with the groove 621, as the interference ring attaches to the interference protrusion 620.

Figure 27A:
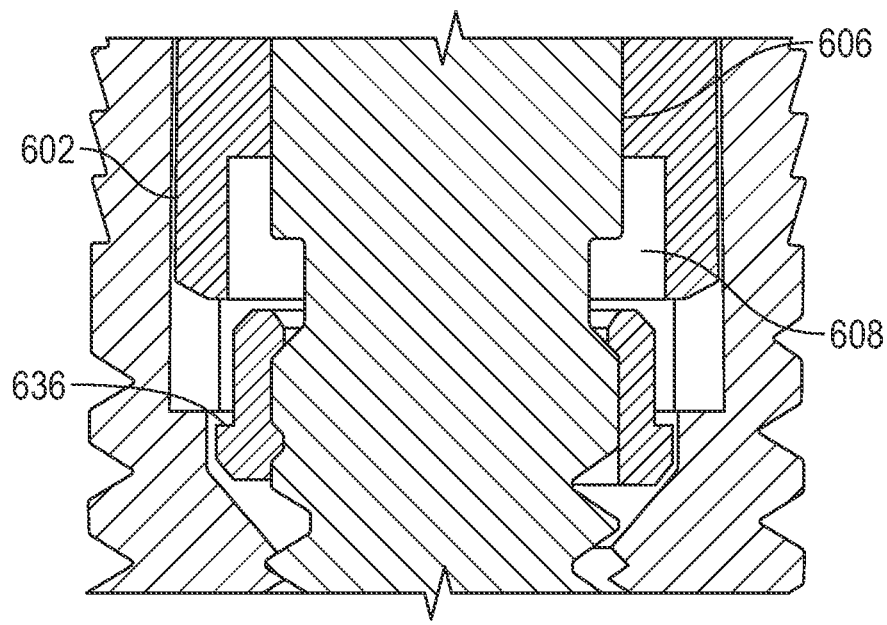
FIG. 27A illustrates a close-up view of a portion of the dental implant system shown in FIG. 26.
Figure 27B:
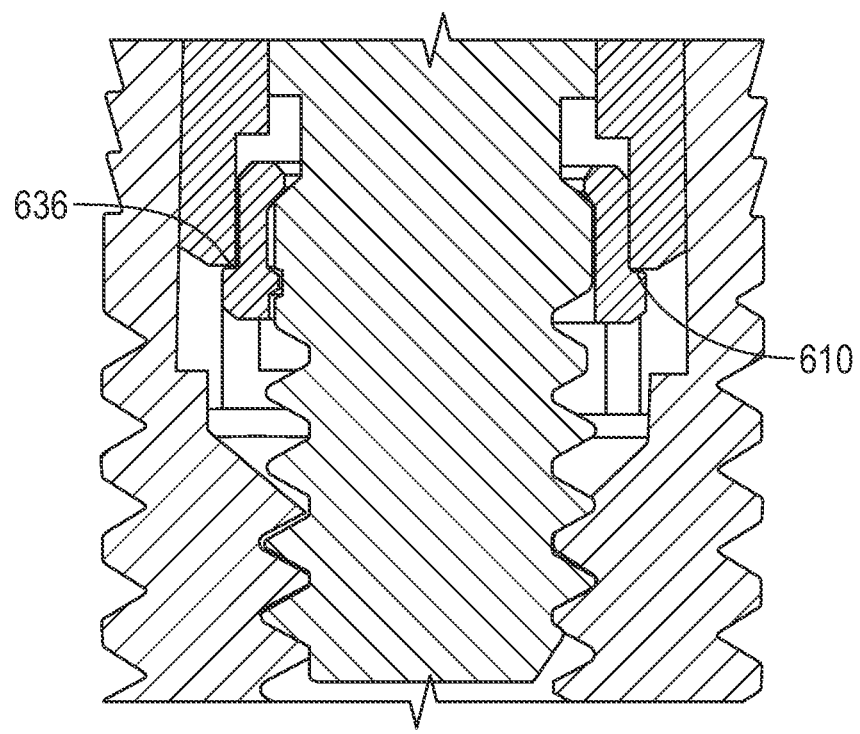
FIG. 27B illustrates the close-up view of the portion of the dental implant system shown in FIG. 27A while the dental component is being removed, in accordance with one example of the present disclosure.
Figure 28C:
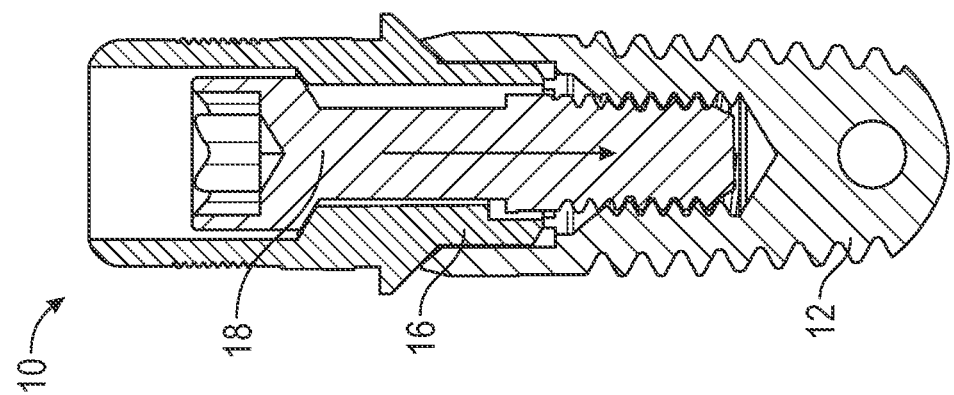
FIG. 28C illustrates a process whereby the screw of FIGS. 1-5B is used to separate the dental component from the dental implant, in accordance with one example of the present disclosure.
Figure 28B:
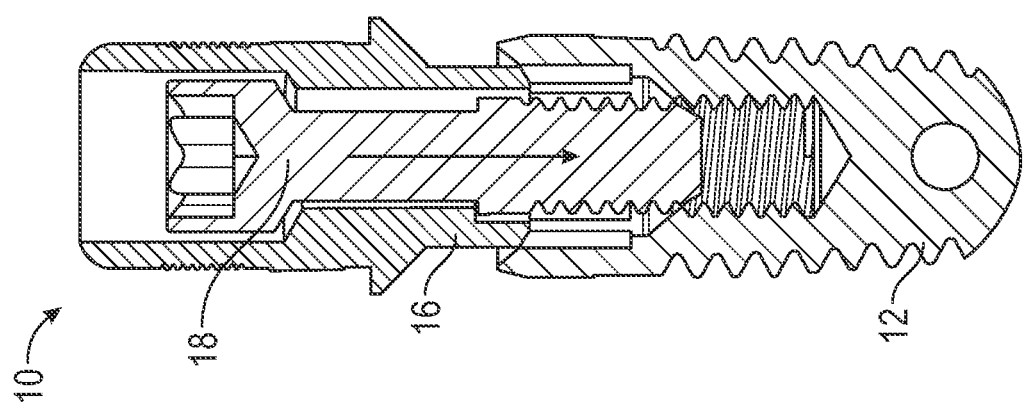
FIG. 28B illustrates a process whereby the screw of FIGS. 1-5B is used to separate the dental component from the dental implant, in accordance with one example of the present disclosure.
Figure 28A:
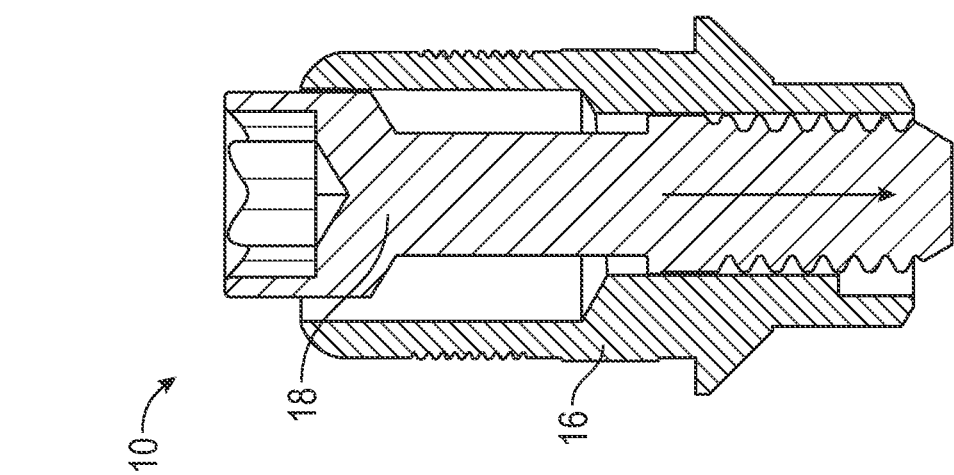
FIG. 28A illustrates a process whereby the screw of FIGS. 1-5B is used to separate the dental component from the dental implant, in accordance with one example of the present disclosure.
Figure 28F:
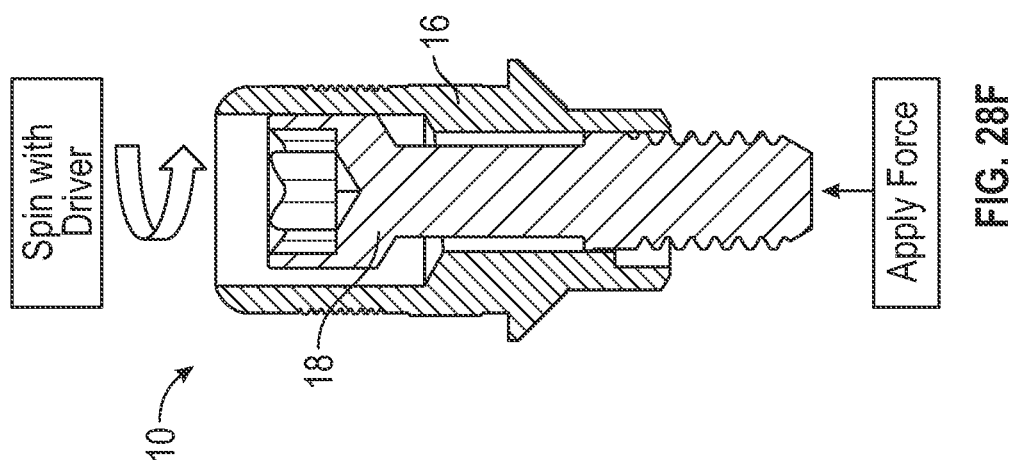
FIG. 28F illustrates a process whereby the screw of FIGS. 1-5B is used to separate the dental component from the dental implant, in accordance with one example of the present disclosure.
Figure 28E:
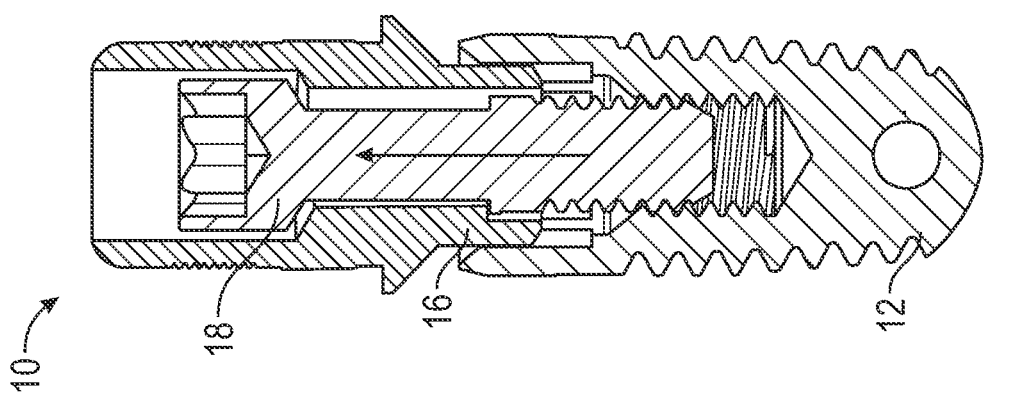
FIG. 28E illustrates a process whereby the screw of FIGS. 1-5B is used to separate the dental component from the dental implant, in accordance with one example of the present disclosure.
Figure 28D:
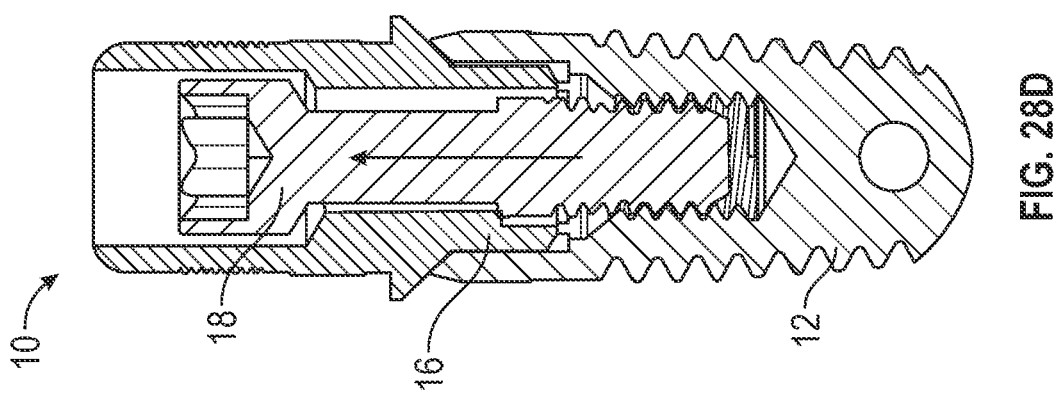
FIG. 28D illustrates a process whereby the screw of FIGS. 1-5B is used to separate the dental component from the dental implant, in accordance with one example of the present disclosure.

FIG. 27A illustrates a fully seated dental component 602 within a dental implant 12'. A diameter of the interference chamber 608 is such that the plurality of fingers 634 can be received within the interference chamber 608 and that the interference surface 636 of the interference ring 630 can contact the interference surface 610 when the dental component 602 is removed, as shown in FIG. 27B. That is, when a removal force is applied to the screw 606, the screw 606 can move coronally with respect to the implant 12' and the dental component 602 until the interference surfaces 610, 636 engage each other such that the friction fit will be overcome and the dental component 602 can be removed from the implant 12', FIG. 28A-28F show a process whereby the dental implant system 10 previously shown in FIGS. 1-5B is assembled and disassembled. FIG. 28A shows the screw 18 installed down into the dental component 16 first. The screw 18 is inserted off axis to get past the internal dental component 16 separation feature (ledge created by the offset hole). FIG. 28B shows the screw 18 further inserted down and threaded into the implant 12. FIG. 28C shows the screw 18 fully inserted down and threaded into the implant 12. Once the screw 18 is fully installed as in FIG. 28C, the screw 18 will shift back to the center axis. The implant 12 and the screw 18 and the dental component 16 can then be brought to another implant (not shown) to be fully seated using the threads on the implant 12. FIGS. 28D-28F show disassembly/removal of the process. The screw 18 can be rotated such as counter clockwise. Since the screw 18 is now on the center axis (rather than off axis) the screw 18 will engage the overhang created by the offset hole in the dental component 16 and separate the dental implant system 10. In particular, the screw 18 when turned will force the dental component 16 out of the implant 12 as shown in FIG. 28E. This separates the dental component 16 from the implant 12.

As discussed previously, once the dental component 16 is separated from the implant 12, the screw 18 can be removed as shown in FIG. 28F by realignment of the axis. The screw 18 can have lobes to help stabilize screw during removal to optimize the interaction between the screw 18 and dental component 16.

Figures 29A, 29B:
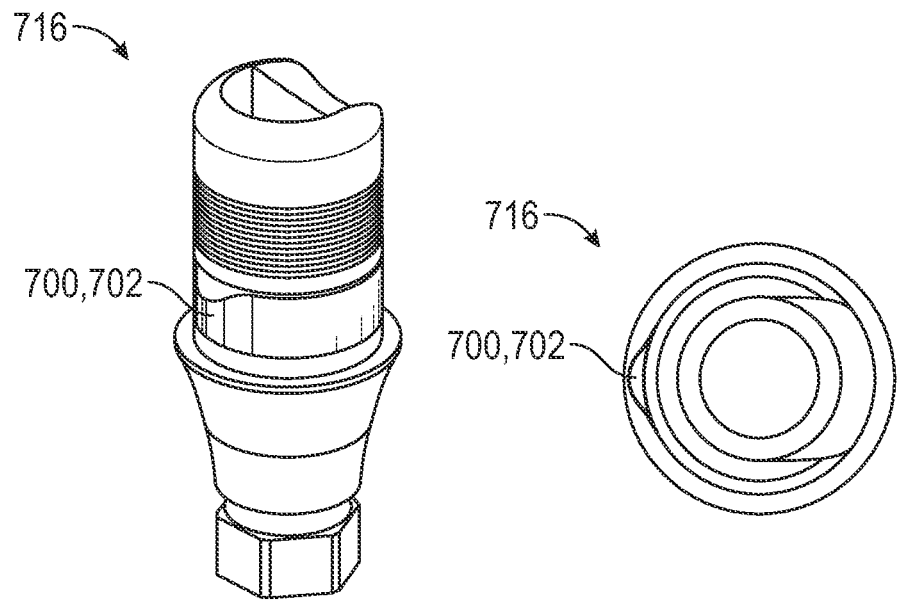
FIG. 29A shows the dental component having an anti-rotation feature comprising a protrusion, in accordance with one example of the present disclosure.
FIG. 29B shows the dental component having an anti-rotation feature comprising a protrusion, in accordance with one example of the present disclosure.

FIGS. 29A and 29B show an example of the dental component 716 that includes a projection 700. This projection 700 can comprise an anti-rotation feature 702 for engagement with a mating component e.g., prosthetic tooth, driver, instrument or the like).

Figures 30A, 30B:
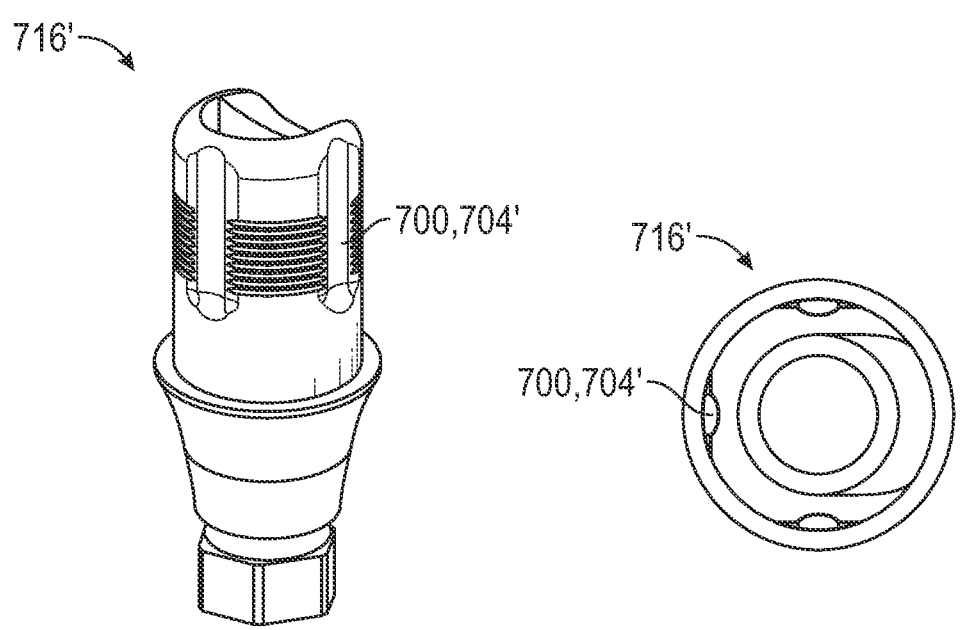
FIG. 30A shows the dental component having an anti-rotation feature comprising a plurality of grooves, in accordance with one example of the present disclosure.
FIG. 30B shows the dental component having an anti-rotation feature comprising a plurality of grooves, in accordance with one example of the present disclosure.

FIGS. 30A and 30B show another example of the dental component 716' that includes a plurality of grooves 704'. The plurality of grooves 704' can comprise an anti-rotation feature 702 for engagement with a mating component (e.g., prosthetic tooth, driver, instrument or the like).

Figures 31, 31A:
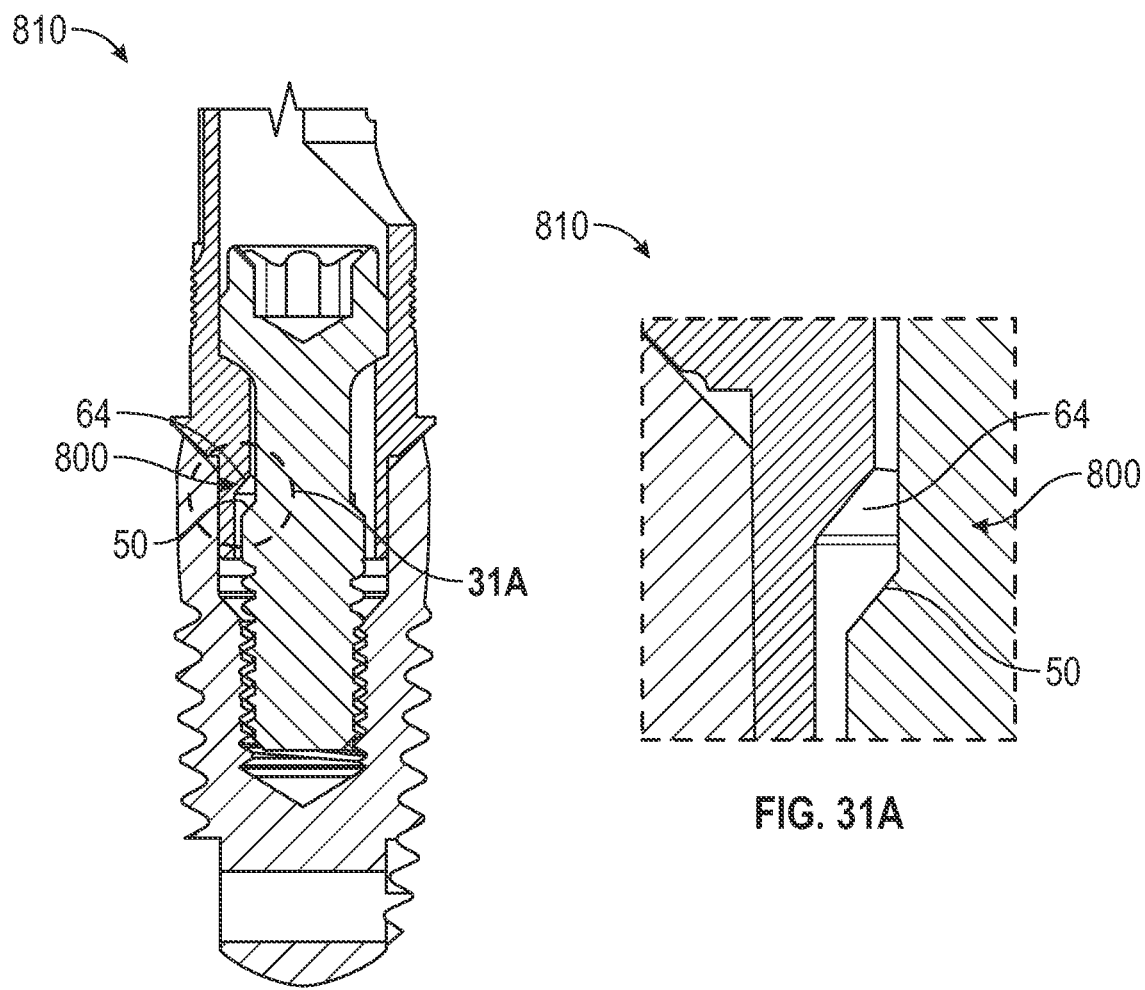
FIG. 31 shows an example of the dental implant system with an angled separation feature, in accordance with on example of the present disclosure.
FIG. 31A shows an example of the dental implant system with an angled separation feature, in accordance with on example of the present disclosure.

FIGS. 31 and 31A show an example of the dental implant system 810 with a similar construction as the dental implant system 10 discussed previously in regard to FIGS. 1-5B. However, the interference ledge 64 and the interference shoulder 50 of the prior example of FIGS. 1-5B has been modified to be angled thus providing for an angled separation feature 800 including an angled ledge 64 and a corresponding angled shoulder 50.

Figure 32:
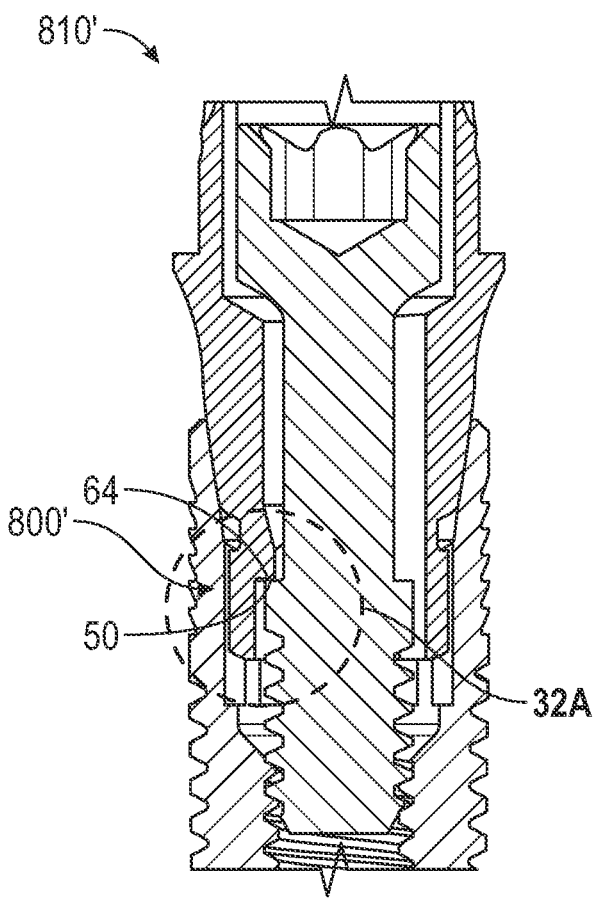
FIG. 32 shows an example of the dental implant system with a hook (angled) separation feature, in accordance with one example of the present disclosure.
Figure 32A:
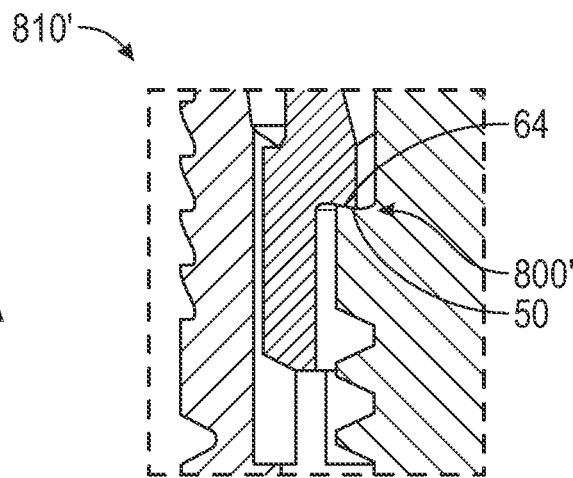
FIG. 32A shows an example of the dental implant system with a hook (angled) separation feature, in accordance with one example of the present disclosure.

FIGS. 32 and 32A show another example of the example of the dental implant system 810' with a similar construction as the dental implant system 10 discussed previously in regard to FIGS. 1-5B. However, the interference ledge 64 and the interference shoulder 50 of the prior example of FIGS. 1-5B has been modified to be angled (in an opposing manner to that of FIGS. 31 and 31A) thus providing for an angled separation feature 800' including an angled ledge 64 and a corresponding angled shoulder 50.

Figure 33:
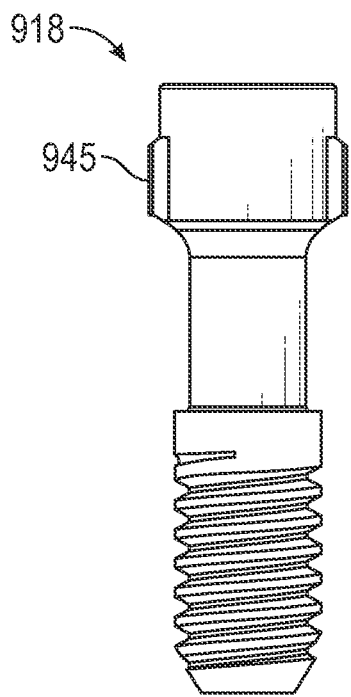
FIG. 33 shows a screw with a dual lobe head design, in accordance with one example of the present disclosure.
Figure 33A:
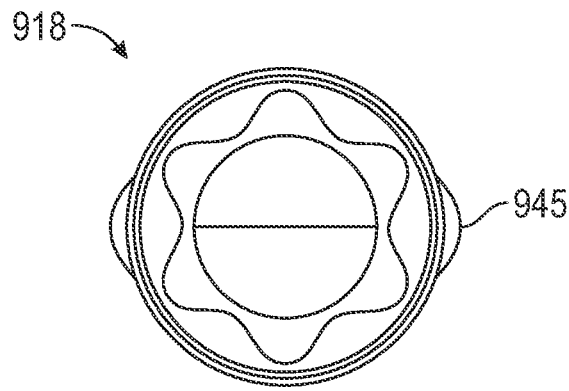
FIG. 33A shows a screw with a dual lobe head design, in accordance with one example of the present disclosure.

FIGS. 33 and 33A show a screw 918 of similar construction to that of screw 18 previously described in FIGS. 1-5B but in includes two lobes 945 rather than three lobes.

Figure 34:
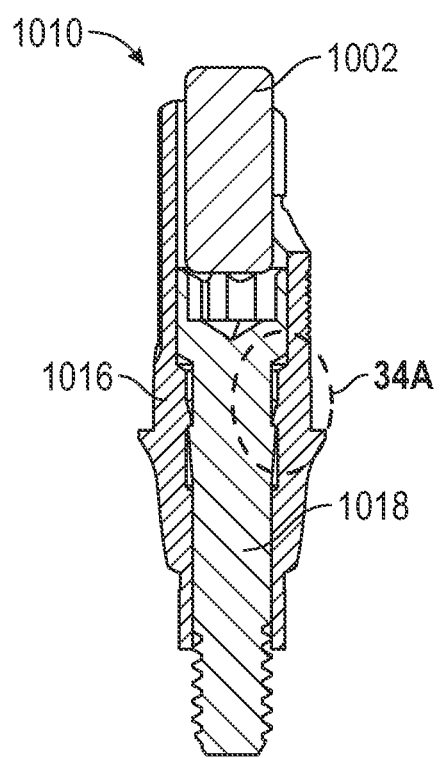
FIG. 34 shows a method and dental implant system with a press-fit engagement between the screw and the dental component, in accordance with one example of the present disclosure.
Figure 34A:
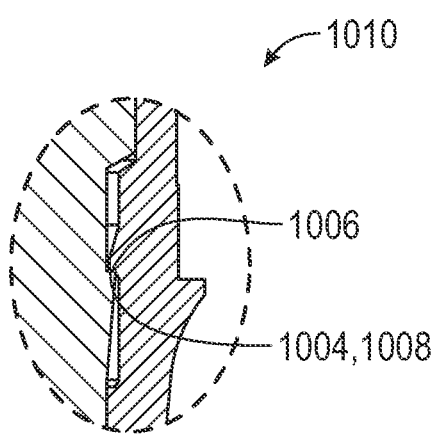
FIG. 34A shows a method and dental implant system with a press-fit engagement between the screw and the dental component, in accordance with one example of the present disclosure.

FIGS. 34 and 34A show a system 1010 including a dental component 1016, screw 1018 and press tool 1002. The screw 1018 and the dental component 1016 can include a press-fit engagement 1004 as shown in FIG. 34A using a first feature 1006 and a second feature 1008. The first feature 1006 can be a ledge similar to those as previously described. The second feature can be a shoulder similar to those previously described. However, other snap fit arrangement such as those using engagement, friction-fit or other mechanisms as known in the art are also contemplated.

Figure 35B:
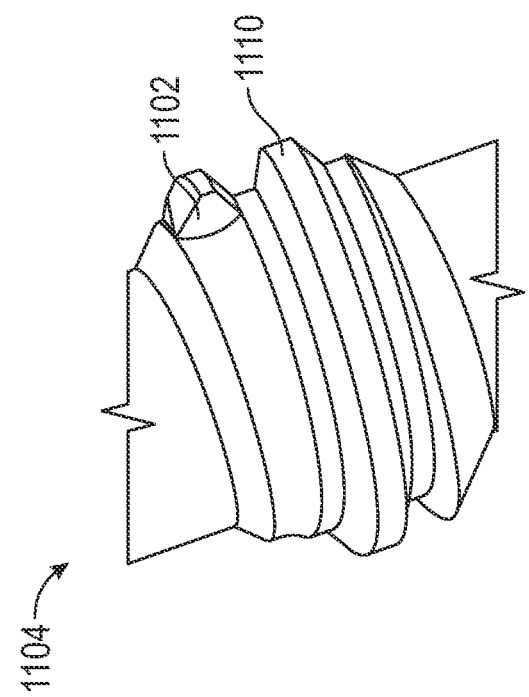
FIG. 35B shows another design for the screw that includes the two threaded sections a coronal section and a distal section and additionally including a notch on the coronal section, in accordance with one example of the present disclosure.
Figure 35A:
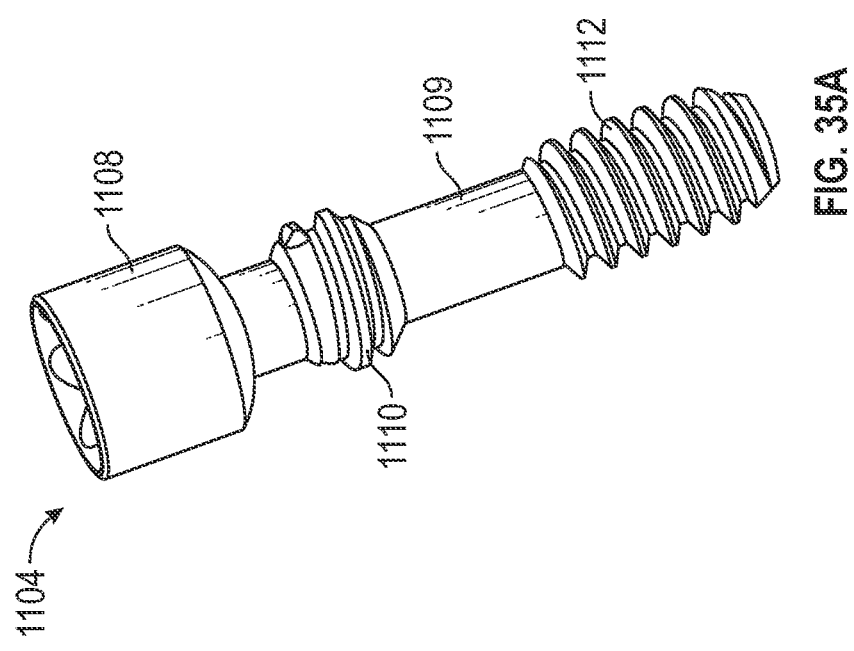
FIG. 35A shows another design for the screw that includes the two threaded sections a coronal section and a distal section and additionally including a notch on the coronal section, in accordance with one example of the present disclosure.

FIGS. 35A and 35B show a screw 1104 similar to the screw 204 previously shown in FIGS. 18A-18C. The screw 1104 includes a head 1108, a shaft 1109, a coronal threaded portion 1110 and an apical threaded portion 1112. The apical threaded portion 1112 includes a right-handed thread that engages the implant (not shown but reference implant 12'). The coronal threaded portion 1110 includes a left-handed thread with a major diameter that is greater than a major diameter of the apical threaded portion 1112. The screw 1104 differs from the screw 204 in that the screw includes a notched first thread 1102 on the coronal threaded portion 1110. This notched first thread 1102 can removes thin thread start that rolls over during removal.

Figure 36B:
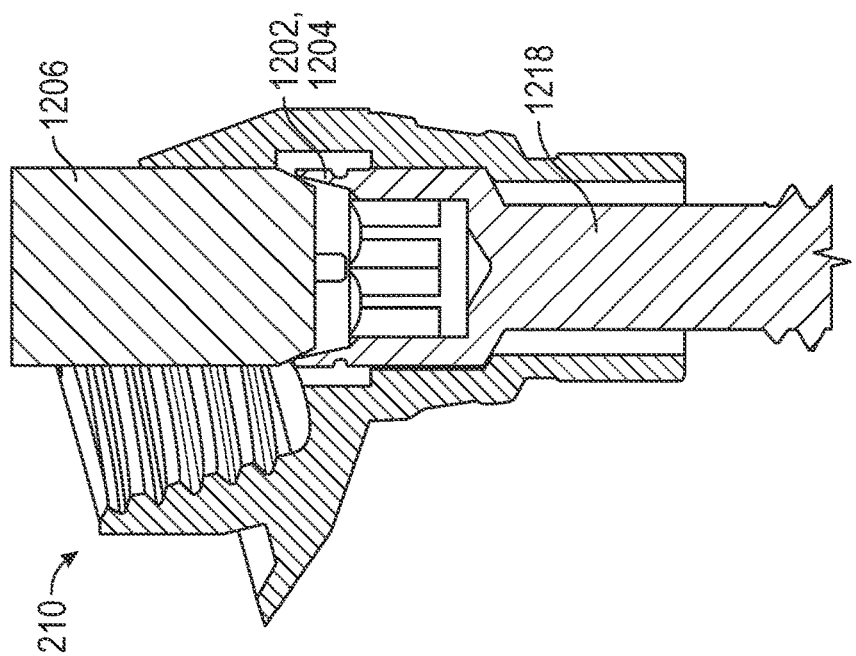
FIG. 36B shows a method and dental implant system with a formable screw head design, in accordance with one example of the present disclosure.
Figure 36A:
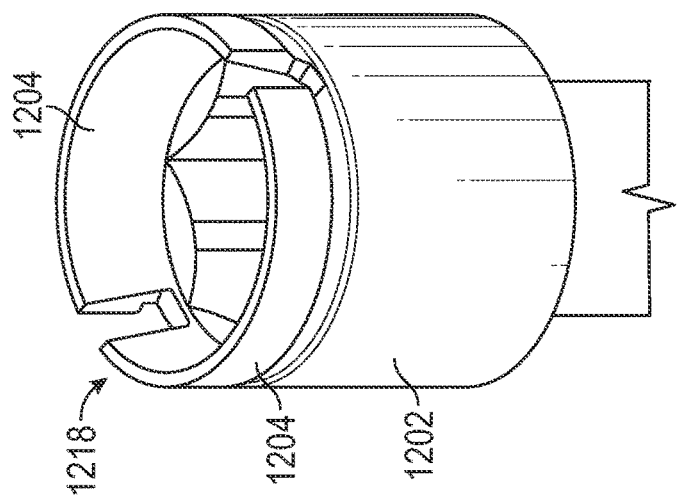
FIG. 36A shows a method and dental implant system with a formable screw head design, in accordance with one example of the present disclosure.
Figure 36:
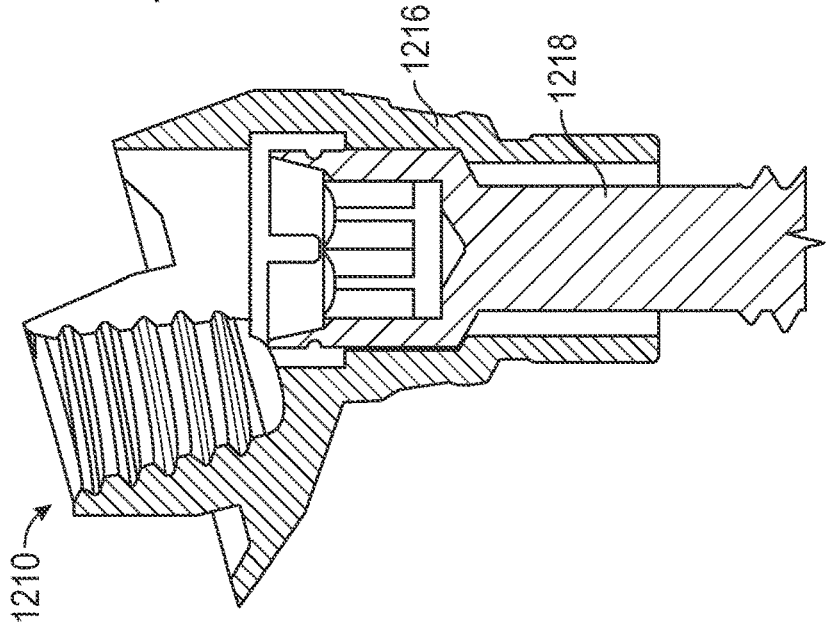
FIG. 36 shows a method and dental implant system with a formable screw head design, in accordance with one example of the present disclosure.
Figure 36D:
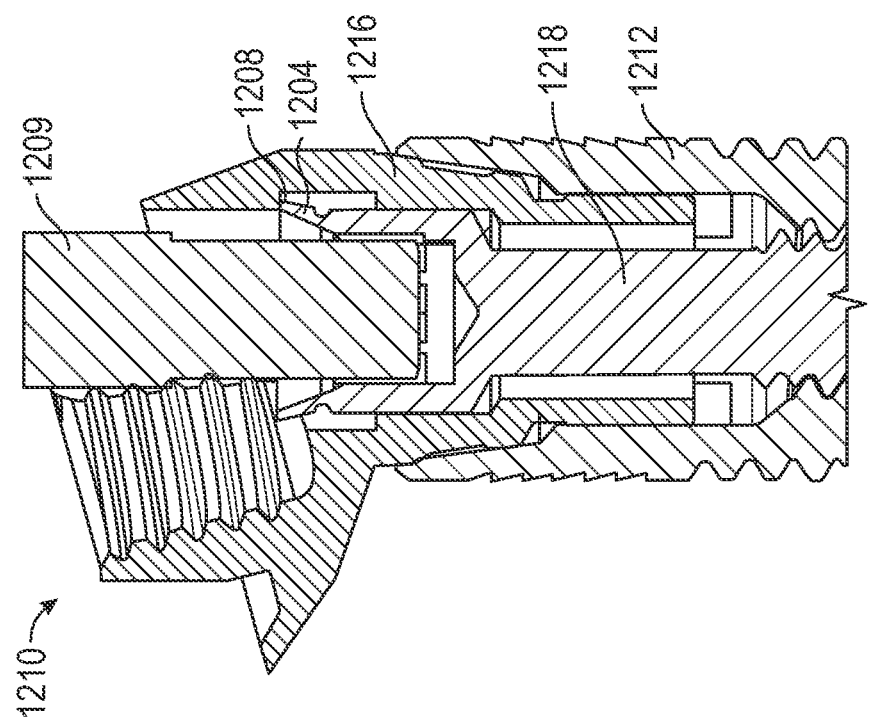
FIG. 36D shows a method and dental implant system with a formable screw head design, in accordance with one example of the present disclosure.
Figure 36C:
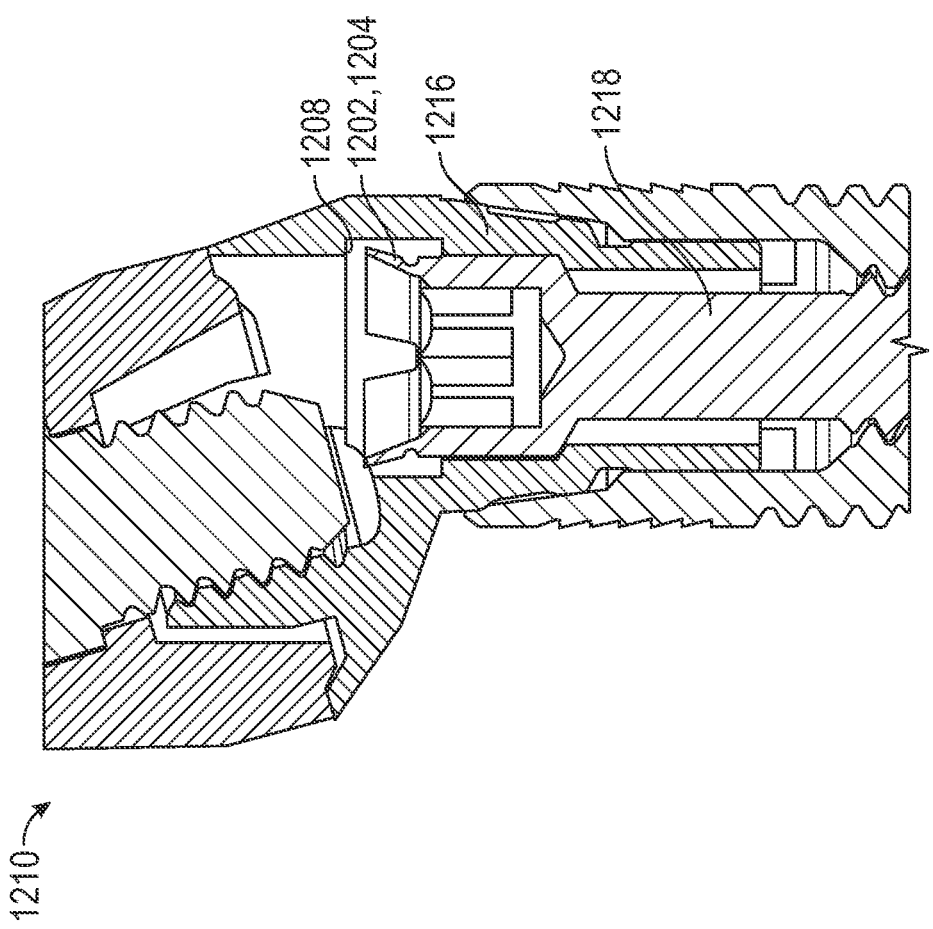
FIG. 36C shows a method and dental implant system with a formable screw head design, in accordance with one example of the present disclosure.

FIG. 36-36D show a process whereby a dental implant system 1210 is assembled and disassembled. FIG. 36A shows the screw 1218 used in isolation showing the head 1202 thereof having formable tabs 1204. This head 1202 can be formed with the tabs 1204 pushed outwards as further discussed herein. FIG. 36 shows the screw 1218 installed down into the dental component 1216 first. The screw 1218 at the head 1202 can then be engaged by a tool 1206 such as a pin to deform the tabs 1204 outward as shown in FIG. 36B. The tabs 1204 can then engage one or more features 1208 of the dental component 1216 to lock the screw 1218 in place (FIG. 36C). FIG. 36D shows disassembly/removal of the process. The screw 1218 can be rotated such as counter clockwise by a screw driver 1209 or other suitable tool. Since the screw 1218 is deformed at the tabs 1204 to engage with the one or more features 1208, the screw 1218 will engage the one or more features 1208 of the dental component 1216 and separate the dental implant system 10. In particular, the screw 1218 when turned will force the dental component 1216 out of the implant 1212 as shown in FIG. 36D. This separates the dental component 1216 from the implant 1212.

EXAMPLES & ADDITIONAL NOTES

To further illustrate the apparatuses, systems and methods disclosed herein, the following non-limiting examples are provided:

Example 1 is a dental implant system that can include a prosthetic assembly optionally including a dental component having a bore extending from a proximal end to a distal end, the dental component having a centerline, wherein the bore includes an interference portion that has a centerline that is offset from the centerline of the dental component, the interference portion defining an interference ledge. The system can include a retention screw configured to extend through the bore of the dental component, the retention screw can optionally include a head, a shaft extending from the head, a threaded portion, and an engagement portion defining an interference shoulder. Optionally, the engagement portion can be configured to engage the interference ledge of the dental component when a removal torque is applied to the retention screw.

Example 2 is the dental implant system of Example 1, optionally wherein, when the engagement portion is positioned within the interference portion, a centerline of the retention screw is aligned with the centerline of the interference portion.

Example 3 is the dental implant system of Example f, wherein optionally the bore includes a screw head portion, positioned proximal to the interference portion, and an engagement section, positioned distal to the interference portion.

Example 4 is the dental implant system of Example 3, wherein optionally the screw head portion terminates at a shoulder, and wherein the interference portion includes an interference wall extending radially inward from the shoulder.

Example 5 is the dental implant system of Example 3, wherein optionally the interference portion extends around less than a total circumference of the shoulder.

Example 6 is the dental implant system of Example 5, wherein optionally the interference portion extends around about fifty percent of the total circumference of the shoulder.

Example 7 is the dental implant system of Example 1, wherein, optionally, along a plane perpendicular to a longitudinal axis of the dental component, the interference portion has a crescent shape.

Example 8 is the dental implant system of Example 1, wherein, optionally, the dental component further includes: an implant engagement section, a post extending proximally from the implant engagement section, and an anti-rotation portion extending distally from the implant engagement section.

Example 9 is the dental implant system of Example 8, optionally further including a dental implant having a center line, the dental implant having an interior bore, optionally including a threaded portion, an anti-rotation chamber, and a dental component engagement portion, wherein, when the dental component is coupled to the dental implant, the anti-rotation portion of the dental component is received within the anti-rotation chamber of the dental implant, the implant engagement section of the dental component engages the dental component engagement portion of the dental implant, and the retention screw extends through the dental component such that the threaded portion engages the threaded portion of the dental implant.

Example 10 is the dental implant system of Example 9, wherein, optionally, when the dental component is coupled to the dental implant, a center line of the dental implant aligns with the center line of the dental component, and the centerline of the interference portion of the dental component is offset from the center line of the dental implant.

Example 11 is the dental implant system of Example 1, wherein optionally the dental component is one of: a connection, straight abutment, angled abutment, mini conical abutment, UCLAs, analogues, transfers, straight post, and angled post.

Example 12 is a prosthetic assembly configured to cooperate with a dental implant, the prosthetic assembly optionally can include a dental component and a retention screw. The dental component can optionally extend from a proximal end to a distal end. The dental component optionally can have a bore extending therethrough. The bore can have an interface wall extending from a proximal end to a distal end. The distal end can define an interference ledge. The interference ledge can be positioned proximally from the distal end of the dental component. The retention screw can be configured to be received within the dental component such that a distal end of the retention screw extends beyond the distal end of the dental component. The retention screw can optionally include a head, a shaft, a threaded portion, and an interference shoulder positioned between the shaft and the threaded portion. The interference shoulder can be configured to engage the interference ledge to limit relative longitudinal motion while allowing relative rotation of the dental component and the retention screw.

Example 13 is the prosthetic assembly of Example 12, wherein optionally a centerline of the component is offset from a centerline of the interference wall.

Example 14 is the prosthetic assembly of Example 13, wherein, optionally, along a plane perpendicular to the center line of the interference wall, the interference wall has a crescent shape.

Example 15 is the prosthetic assembly of Example 14, wherein optionally the dental component is one of: a connection, straight abutment, angled abutment, mini conical abutment, UCLAs, analogues, transfers, straight post, and angled post.

Example 16 is a dental implant system including a dental component, a retention screw and a dental implant. The dental component can extend from a proximal end to a distal end. The dental component can have a bore extending therethrough. The bore can have an interface wall extending from a proximal end to a distal end. The distal end can define an interference ledge. The interference ledge can be positioned proximally from the distal end of the dental component. The retention screw can be configured to be received within the dental component such that a distal end of the retention screw extends beyond the distal end of the dental component. The retention screw can include a head, a shaft, a threaded portion, and an interference shoulder positioned between the shall and the threaded portion. The interference shoulder can be configured to engage the interference ledge to limit relative longitudinal motion while allowing relative rotation of the dental component and the retention screw. The dental implant can have a center line. The dental implant can have an interior bore including a threaded portion, an anti-rotation chamber, and a dental component engagement portion.

Example 17 is the dental implant system of Example 16, wherein optionally a centerline of the dental component is offset from a centerline of the interference wall.

Example 18 is the dental implant system of Example 17, wherein, optionally, when the retention screw is inserted through the dental component, a centerline of the retention screw is aligned with the centerline of the interference wall and offset from the centerline of the dental component.

Example 19 is the dental implant system of Example 18, wherein, optionally, when the dental component is coupled to the dental implant and the retention screw is engaged with the threaded portion of the dental implant, a center line of the dental implant is aligned with the centerline of the screw and the center line of the dental component.

Example 20 is the dental implant system of Example 19, wherein, optionally, when a removal torque is applied to an assembled dental implant system, the retention screw is configured to move proximally until the interference shoulder engages the interference ledge such that a portion of the removal torque is converted into a linear force and applied to the interference ledge of the dental component to remove the dental component and the retention screw from the dental abutment.

Example 21 is any one or combination of features or elements of the Examples 1-20.

The above description is intended to be illustrative, and not restrictive. For example, the above-described examples (or one or more aspects thereof) may be used in combination with each other. Other examples can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above detailed description, various features may be grouped together to streamline the disclosure. This should not be interpreted as intending that an unclaimed disclosed feature is essential to any claim. Rather, inventive subject matter may lie in less than all features of a particular disclosed example. Thus, the following claims are hereby incorporated into the detailed description as examples or embodiments, with each claim standing on its own as a separate example, and it is contemplated that such examples can be combined with each other in various combinations or permutations. The scope of the invention should be determined with reference to the appended claims, along with the full scope of equivalents to which such claims are entitled.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventor also contemplate examples in which only those elements shown or described are provided. Moreover, the present inventor also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The claimed invention is:

1. A dental implant system, comprising:
   a prosthetic assembly including:
      a dental component having a bore extending through the dental component from a proximal end to a distal end, the dental component extending through a longitudinal centerline, the bore comprising a screw head portion and an interference portion positioned distal to the screw head portion, wherein the screw head portion extends through a longitudinal centerline aligned with the longitudinal centerline of the dental component and wherein the interference portion extends through a longitudinal centerline that is offset spatially from the longitudinal centerline of the dental component, the interference portion defining an interference ledge; and
      a retention screw configured to extend through the bore of the dental component, the retention screw including:
         a head;
         a shaft extending from the head;
         a threaded portion; and
         an engagement portion defining an interference shoulder,
   wherein, in a first mode, the retention screw shaft is positioned in the interference portion and the engagement portion is configured to engage the interference ledge of the dental component when a removal torque is applied to the retention screw and, in a different second mode, the retention screw shaft is positioned in the interference portion and the engagement portion is configured to be disengaged from the interference ledge of the dental component in the absence of application of the removal torque.

2. The dental implant system of claim 1, wherein the retention screw extends through a longitudinal centerline, wherein, when the retention screw is inserted through the dental component, the engagement portion of the retention screw is positioned within the dental component interference portion, the longitudinal centerline of the retention screw is aligned with the longitudinal centerline of the dental component interference portion, the longitudinal centerline of the dental component being offset spatially from the longitudinal centerline of the dental component interference portion, wherein a diameter (D2) of the screw head portion is greater than a diameter (D4) of an engagement portion of the dental component.

3. The dental implant system of claim 1, wherein the retention screw includes a plurality of lobes.

4. The dental implant system of claim 1, wherein the retention screw extends through a longitudinal centerline, wherein the retention screw is inserted into the bore off-axis relative to the longitudinal centerline of the dental component to enable the retention screw engagement portion to bypass the interference ledge, wherein, when the retention screw engagement portion is positioned in the engagement portion, the longitudinal centerline of the retention screw aligns with the longitudinal centerline of the dental component, and wherein, the dental component further includes:
   an implant engagement section;
   a post extending proximally from the implant engagement section; and
      an anti-rotation portion extending distally from the implant engagement section.

5. The dental implant system of claim 4, further including:
a dental implant extending through a longitudinal centerline, the dental implant having an interior bore, including:
a threaded portion, an anti-rotation chamber, and a dental component engagement portion,
wherein, when the dental component is coupled to the dental implant, the anti-rotation portion of the dental component is received within the anti-rotation chamber of the dental implant, the implant engagement section of the dental component engages the dental component engagement portion of the dental implant, and the retention screw extends through the dental component such that the threaded portion engages the threaded portion of the dental implant.

6. The dental implant system of claim 5, wherein, when the dental component is coupled to the dental implant, the longitudinal centerline of the dental implant aligns with the longitudinal centerline of the dental component, and the longitudinal centerline of the interference portion of the dental component is offset from the longitudinal centerline of the dental implant.

7. The dental implant system of claim 5, wherein the post of the dental component includes one or more grooves therein, and wherein the dental component is one of: a connection, straight abutment, angled, low profile, tapered abutment, mini conical abutment, UCLAs, analogues, transfers, straight post, and angled post.

8. A prosthetic assembly configured to cooperate with a dental implant, the prosthetic assembly comprising:
a dental component extending through a longitudinal centerline from a proximal end to a distal end, the dental component having a bore extending therethrough, the bore having an interference wall extending from a proximal surface to a distal surface, the distal surface defining an interference ledge, wherein the interference ledge is positioned proximally from the distal end of the dental component and wherein the interference wall extends through a longitudinal centerline that is spatially offset from and not intersecting the longitudinal centerline of the dental component; and
a retention screw configured to be received within the dental component to engage a dental implant such that a distal end of the retention screw extends beyond the distal end of the dental component, the retention screw including a head, a shaft, a threaded portion, and an interference shoulder positioned between the shaft and the threaded portion, the interference shoulder configured to engage the interference ledge to limit relative longitudinal motion while allowing relative rotation of the dental component and the retention screw.

9. The prosthetic assembly of claim 8, wherein the retention screw extends through a longitudinal centerline, wherein, when the retention screw is inserted through the dental component, the longitudinal centerline of the retention screw is aligned with the longitudinal centerline of the interference wall and offset from the longitudinal centerline of the dental component and wherein the bore comprises an engagement portion positioned distal to the interference ledge configured to receive the interference shoulder of the retention screw.

10. The prosthetic assembly of claim 9, wherein an interference portion is positioned distal to the screw head, wherein, when the retention screw shaft is positioned in the interference portion, the engagement portion is configured to engage the interference ledge of the dental component when a removal torque is applied to the retention screw and wherein, along a plane perpendicular to the longitudinal centerline of the interference wall, the interference wall has a crescent shape.

11. The prosthetic assembly of claim 10, wherein the dental component has one or more grooves that are configured to act as anti-rotation features and wherein, when in a first mode a removal torque is applied to a retention screw shaft positioned in the interference portion causing the engagement portion to engage the interference ledge of the dental component to cause removal of the prosthetic assembly from the dental implant and, in a second mode, a removal torque is not applied to the retention screw shaft and the engagement portion is spaced from the interference ledge of the dental component.

12. A dental implant system, comprising:
a dental component extending through a longitudinal centerline from a proximal end to a distal end, the dental component having a bore extending therethrough, the bore having an interference wall extending from a proximal surface to a distal surface, the distal surface defining an interference ledge, wherein the interference ledge is positioned proximally from the distal end of the dental component and wherein the interference wall extends through a longitudinal centerline that is spatially offset from and parallel to the longitudinal centerline of the dental component;
a retention screw configured to be received within the dental component such that a distal end of the retention screw extends beyond the distal end of the dental component, the retention screw including a head, a shaft, a threaded portion, and an interference shoulder positioned between the shaft and the threaded portion, the interference shoulder configured to engage the interference ledge to limit relative longitudinal motion while allowing relative rotation of the dental component and the retention screw; and
a dental implant extending through a longitudinal centerline, the dental implant having an interior bore, including a threaded portion, an anti-rotation chamber, and a dental component engagement portion, wherein, when the retention screw is received within the dental component and the threaded portion is received in the interior bore of the dental implant, the longitudinal centerline of the dental implant is aligned with the longitudinal centerline of the dental component but spatially offset from the longitudinal centerline of the interference wall.

13. The dental implant system of claim 12, wherein the retention screw extends through a longitudinal centerline, wherein, when the retention screw is inserted through the dental component, the longitudinal centerline of the retention screw is aligned with the longitudinal centerline of the interference wall and offset from the longitudinal centerline of the dental component and wherein the bore comprises an engagement portion positioned distal to the interference ledge configured to receive the interference shoulder of the retention screw.

14. The dental implant system of claim 13, wherein, when the retention screw is inserted through the dental component, the longitudinal centerline of the retention screw is aligned with the longitudinal centerline of the interference wall and offset from the longitudinal centerline of the dental component.

15. The dental implant system of claim 14, wherein, when the dental component is coupled to the dental implant and the retention screw is engaged with the threaded portion of the dental implant, the longitudinal centerline of the dental implant is aligned with the longitudinal centerline of the retention screw and the longitudinal centerline of the dental component.

16. The dental implant system of claim 15, wherein the dental component comprises a dental abutment, wherein, when a removal torque is applied to an assembled dental implant system, the retention screw is configured to move proximally until the interference shoulder engages the interference ledge such that a portion of the removal torque is converted into a linear force and applied to the interference ledge of the dental component to remove the dental component and the retention screw from the dental abutment.

\* \* \* \* \*